(12) United States Patent
Nyisztor et al.

(10) Patent No.: US 9,258,669 B2
(45) Date of Patent: Feb. 9, 2016

(54) REGISTERING A MOBILE APPLICATION WITH A SERVER

(71) Applicants: Karoly Nyisztor, Dunakeszi (HU); Csaba Hereb, Budapest (HU); Andras Palfi, Budapest (HU); Hans Kedefors, Hillsborough, CA (US); Tamas Jozsa, Kistarcsa (HU); Karsten Hinrichs, Ludwigshafen (DE)

(72) Inventors: Karoly Nyisztor, Dunakeszi (HU); Csaba Hereb, Budapest (HU); Andras Palfi, Budapest (HU); Hans Kedefors, Hillsborough, CA (US); Tamas Jozsa, Kistarcsa (HU); Karsten Hinrichs, Ludwigshafen (DE)

(73) Assignee: SAP SE, Walldorf (DE)

( * ) Notice: Subject to any disclaimer, the term of this patent is extended or adjusted under 35 U.S.C. 154(b) by 157 days.

(21) Appl. No.: 14/067,593

(22) Filed: Oct. 30, 2013

(65) Prior Publication Data

US 2015/0040201 A1 Feb. 5, 2015

Related U.S. Application Data

(60) Provisional application No. 61/860,703, filed on Jul. 31, 2013, provisional application No. 61/860,716, filed on Jul. 31, 2013.

(51) Int. Cl.
*H04L 29/06* (2006.01)
*H04W 4/00* (2009.01)
*H04L 12/24* (2006.01)
*G06F 9/445* (2006.01)
*H04L 29/08* (2006.01)
*G06F 9/44* (2006.01)

(52) U.S. Cl.
CPC ............... *H04W 4/003* (2013.01); *G06F 8/60* (2013.01); *G06F 8/65* (2013.01); *G06F 8/71* (2013.01); *G06F 9/44505* (2013.01); *H04L 41/082* (2013.01); *H04L 63/08* (2013.01); *H04L 67/34* (2013.01); *G06F 8/36* (2013.01)

(58) Field of Classification Search
CPC combination set(s) only.
See application file for complete search history.

(56) References Cited

U.S. PATENT DOCUMENTS

| 7,711,607 | B2* | 5/2010 | Agassi et al. ................. 705/26.5 |
|---|---|---|---|
| 7,778,968 | B2* | 8/2010 | Cherry ........................... 707/611 |
| 7,849,445 | B2* | 12/2010 | Tran ............................... 717/124 |
| 8,095,911 | B2 | 1/2012 | Ronen et al. |
| 8,423,954 | B2 | 4/2013 | Ronen et al. |
| 8,666,438 | B1* | 3/2014 | Reeves ..................... H04W 4/18 455/414.3 |
| 8,693,995 | B2 | 4/2014 | Fisher |
| 8,700,804 | B1 | 4/2014 | Meyers et al. |
| 8,745,583 | B2 | 6/2014 | Ronen et al. |
| 2002/0116648 | A1* | 8/2002 | Tran ........................ G06F 21/31 726/3 |
| 2004/0162880 | A1* | 8/2004 | Arnone ............... H04L 12/1895 709/206 |

(Continued)

OTHER PUBLICATIONS

TechNet (Microsoft's TechNet, "How TLS/SSL Works: Logon and Authentication", found at https://technet.microsoft.com/en-us/library/cc783349(v=ws.10).aspx, Mar. 2003).*

(Continued)

*Primary Examiner* — Peter Poltorak
(74) *Attorney, Agent, or Firm* — Schwegman Lundberg & Woessner, P.A.

(57) ABSTRACT

In an example embodiment, a test request is sent to a server configured to provide data to the mobile device application. Then a response to the test request is received from the server. The response is analyzed to identify a pattern in the response indicative of a communication sent via a particular communication path. An available communication path between the mobile device application and the server corresponding to the pattern is identified. Then, a mobile device application is registered with the server via the identified communication path.

19 Claims, 23 Drawing Sheets

(56) References Cited

U.S. PATENT DOCUMENTS

| | | | | |
|---|---|---|---|---|
| 2006/0206704 | A1* | 9/2006 | Gauby et al. | 713/150 |
| 2008/0098099 | A1* | 4/2008 | Khasnis | G06F 8/61 709/222 |
| 2009/0013142 | A1* | 1/2009 | Kimura | 711/165 |
| 2009/0070030 | A1* | 3/2009 | Isoda et al. | 701/207 |
| 2009/0328144 | A1* | 12/2009 | Sherlock | G06F 21/10 726/2 |
| 2010/0138933 | A1* | 6/2010 | Yamashita | 726/30 |
| 2010/0313019 | A1* | 12/2010 | Joubert | 713/168 |
| 2011/0191177 | A1* | 8/2011 | Blackhurst et al. | 705/14.51 |
| 2012/0117599 | A1* | 5/2012 | Jin et al. | 725/41 |
| 2012/0317228 | A1* | 12/2012 | Bohrer et al. | 709/217 |
| 2013/0073326 | A1* | 3/2013 | Jordan | G06Q 10/06 705/7.11 |
| 2013/0159484 | A1* | 6/2013 | S | 709/223 |
| 2013/0254125 | A1* | 9/2013 | Sanders | 705/310 |
| 2013/0340048 | A1* | 12/2013 | Sebastian et al. | 726/4 |
| 2014/0004825 | A1 | 1/2014 | Prakash et al. | |
| 2014/0007215 | A1 | 1/2014 | Romano et al. | |
| 2014/0012997 | A1* | 1/2014 | Erbe | 709/228 |
| 2014/0109078 | A1* | 4/2014 | Lang et al. | 717/172 |
| 2014/0195844 | A1 | 7/2014 | Laval et al. | |
| 2014/0201760 | A1 | 7/2014 | Kraljic et al. | |
| 2014/0245377 | A1 | 8/2014 | Faltyn et al. | |
| 2014/0281539 | A1 | 9/2014 | Faltyn et al. | |
| 2014/0282983 | A1* | 9/2014 | Ju et al. | 726/8 |
| 2014/0372293 | A1* | 12/2014 | Leung et al. | 705/40 |

OTHER PUBLICATIONS

TechNet2 (Microsoft's TechNet, "Overview of SSL/TLS Encryption", found at https://technet.microsoft.com/en-us/library/cc781476(v=ws.10).aspx, Jul. 2003.*

Torres (Gabriel Torres, "How TCP/IP Protocol Works—Part 1", Mar. 2012).*

O'Reilly (Grigorik, "High Performance Browser Networking", ISBN: 978-1-4493-4471-9, Sep. 2013).* eTutorials (etutorials.org, Transport Layer Security (TLS), May 2013).*

* cited by examiner

REGISTERING A MOBILE APPLICATION WITH A SERVER

CROSS REFERENCE TO RELATED APPLICATIONS

This application claims priority to U.S. Provisional Patent Application No. 61/860,703, filed on Jul. 31, 2013, entitled "MOBILE APPLICATION FRAMEWORK EXTENSIBILITY," and U.S. Provisional Patent Application No. 61/860,716, filed on Jul. 31, 2013, entitled "LOGON MANAGER," both of which are hereby incorporated by reference in their entirety.

TECHNICAL FIELD

The subject matter disclosed herein generally relates to the processing of data and, for example, to managing communications between devices.

BACKGROUND

Mobile applications (also known as "apps") have dramatically increased in popularity with the rise of smartphones and tablets. It is common for these applications to be downloaded by end users from a central repository, sometimes referred to as an "app store" or other location where digital files can be downloaded to user devices. App developers typically design the application, test the code, compile the code, and then upload the compiled code representing the app to the app store. Updates to the app, even for minor changes such as user interface changes (e.g., logo changes, font changes, color changes, and so on) still may require that the application be recompiled and uploaded to the app store, where a user may need to download the latest version.

BRIEF DESCRIPTION OF THE DRAWINGS

The present technology is illustrated by way of example, and not by way of limitation, in the figures of the accompanying drawings.

FIGS. 8A-8B are screen shots of login screens for a mobile application, in accordance with an example embodiment.

DETAILED DESCRIPTION

Overview

Systems and methods for registering mobile applications in an enterprise environment are described. In some example embodiments, the systems and methods send a test request to a server configured to provide data to the mobile device application, receive a response to the test request from the server, identify an available communication path (e.g., gateway or mobile platform) between the mobile device application and the server based on content within the response to the test request, and register the mobile device application with the server via the identified communication path.

In the following description, for purposes of explanation, numerous specific details are set forth to provide a thorough understanding of example embodiments. It will be evident to one skilled in the art, however, that the present subject matter may be practiced without these specific details.

Example Computing Environment

A mobile application framework (MAF) enables a powerful and flexible platform to be used to create and distribute mobile applications. The framework allows designers to build and run customizable native mobile applications. In some example embodiments, the mobile application framework provides customization, changeability and extensibility, dynamic configuration, reusable components, and a standardized look and feel. The mobile application framework may also provide the ability to build native enterprise ready mobile applications that are customizable and extensible. In some example embodiments, this may be accomplished through configuration rather than by coding changes, which may assist maximizing developer productivity.

Figure 1:
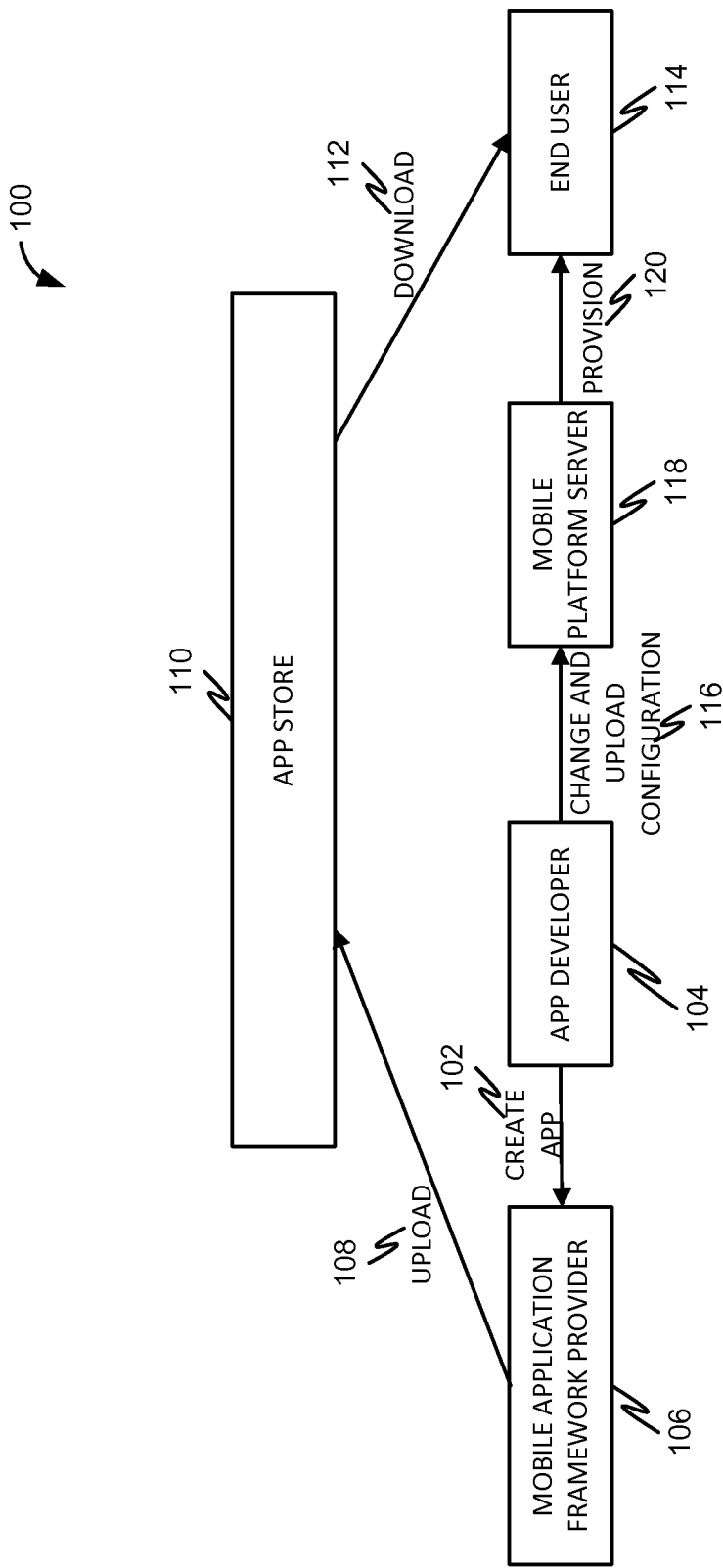
FIG. 1 is a diagram illustrating a method, in accordance with an example embodiment, of provisioning an update to a mobile application.

FIG. 1 is a diagram illustrating a method 100, in accordance with an example embodiment, of provisioning an update to a mobile application.

In operation 102, an application developer 104 may create an application using a mobile application framework provider 106. This process will be described in more detail below, but generally the application developer 104 may include one or more configuration files in the application. At operation 108, the mobile application framework provider 106 may upload the created application to an app store 110. Subsequently, at operation 112, an end-user 114 may download the application from the app store 110.

Later, when the application developer 104 wishes to make a change to a portion of the application, such as altering user interface elements, the application developer 104 may, at operation 116, change one or more configuration files and upload the altered configuration files to a mobile platform server 118. At operation 120, the mobile platform server 118 may provision the new configuration files to the end-user 114.

Figure 2:
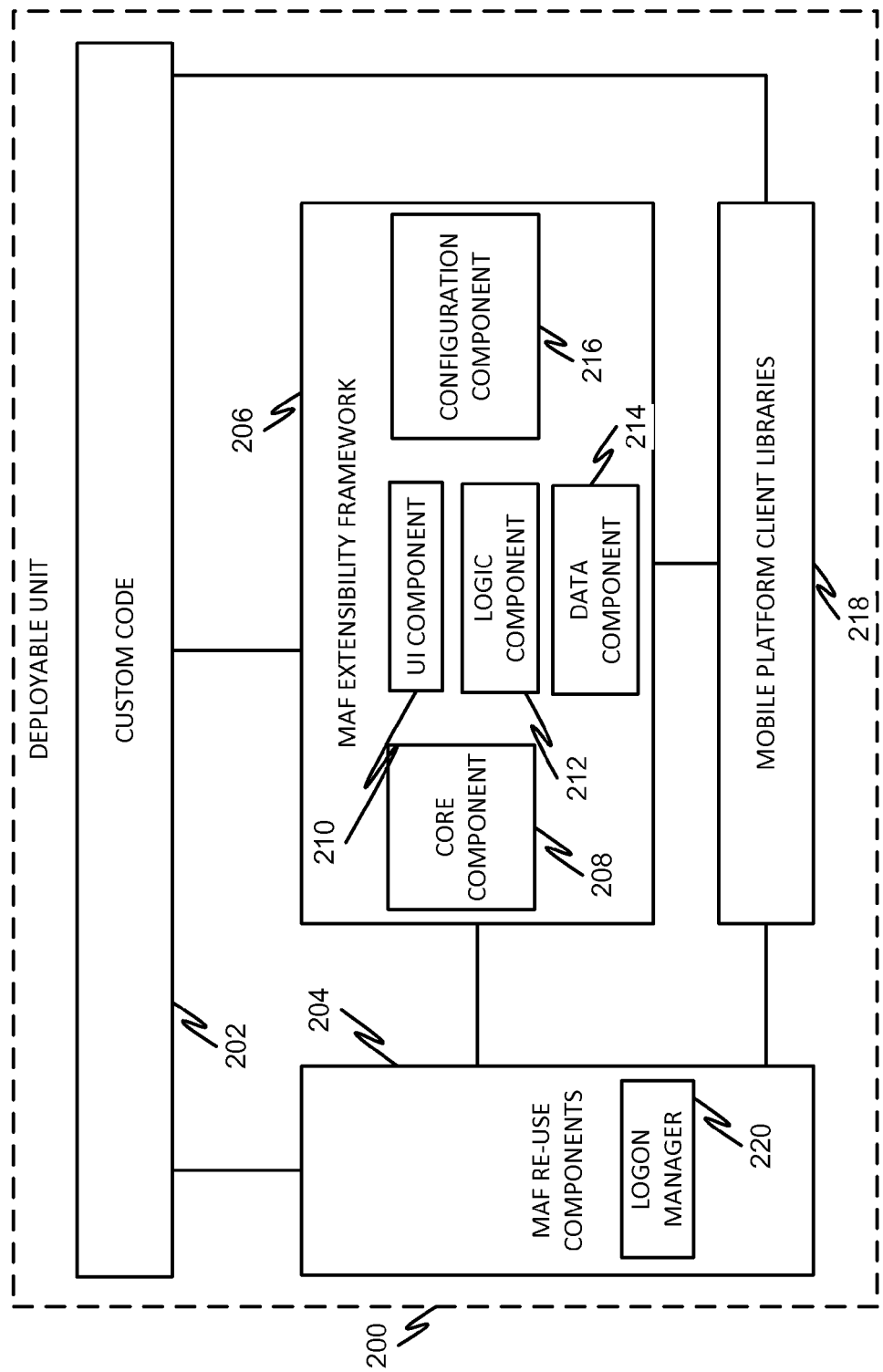
FIG. 2 is a block diagram illustrating a system, in accordance with an example embodiment, for provisioning an update to a mobile application.

FIG. 2 is a block diagram illustrating a system, in accordance with an example embodiment, of provisioning an update to a mobile application. The system includes a deployable unit 200, which can be deployed as a whole to a mobile device for execution. This mobile device may be, for example, an end-user device. The deployable unit 200 may include custom code 202, which may be developed by an application developer. The custom code 202 may include mobile application framework re-use components 204, such as a logon manager 220, to be discussed in greater detail herein. The mobile application framework re-use components 204 may be developed by a mobile application framework provider. The mobile application framework re-use components 204 may be part of a series of mobile application framework libraries that can be downloaded and included in the deployable unit 200 by the application developer. Also, a part of the series of mobile application framework libraries is the mobile application framework extensibility framework 206. By including these mobile application framework libraries in the deployable unit 200, the application developer provides a mechanism by which elements of the application can be modified after deployment to an end-user, without calling for recompilation and/or redistribution of the application.

The mobile application framework extensibility framework 206 may include a number of components, including a core component 208. The core component 208 may expose application program interfaces (APIs) that initialize the framework 206 and access additional functionality provided by internal components. A user interface component 210 may encapsulate a metadata-driven view, controller, and data binding generation functionalities. A logic component 212 may create controllers associated with the metadata and maintain responsibility for the behavior of the application, including business logic. A data component 214 may provide a unified façade to the underlying data access technology. A configuration component 216 may read and parse all the metadata needed by the application, such as user interface definitions, data bindings, user interface elements and controls, events, and actions (built-in and custom). The configuration component 216 may also transform metadata to native constructs using wrapper classes, dedicated parsers, and validators.

Mobile platform client libraries 218 may store metadata in the form of configuration files. In an example embodiment, user interface elements may be included in the mobile platform client libraries 218 in the form of tiles. A tile is a user interface elements or screen, which can be primitive or can embed further tiles. Theoretically, tiles can be nested to an unlimited level.

When a deployable unit 200 is compiled, uploaded to an app store, downloaded by an end user, and executed, the deployable unit 200 may simply execute as an ordinary application would, running various functions from the custom code 202. When a call to a mobile application framework re-use component 204 is encountered in the custom code 202, then control may pass one or more functions defined within the mobile application framework re-use component 204. The mobile application framework re-use component 204 may then be executed using functionality within the mobile application framework extensibility framework 206, which may retrieve one or more tiles from the configuration files in the mobile platform client libraries 218.

When an application developer wishes to update one or more user interface elements or other metadata of the application, the application developer may update one or more configuration files within the mobile platform client libraries 218 by updating a mobile platform server that can deploy the updates to these mobile platform client libraries 218 to the end-user device. Since modification of these mobile platform client libraries 218 does not directly alter the functionality of the code, such as custom code 202, of the application, there is no need to recompile the application in order to benefit from the updates.

In some example embodiments, each application ships with a predefined set of default configuration data, which is added to the project as a resource bundle. External configuration files can override the defaults. These external configuration files allow an application developer to modify and enhance the look and feel of the application, add or remove user interface elements and screens, modify data bindings, and so on. This may all be accomplished without having to recompile the application. In some example embodiments, the configuration files are distributed from a mobile platform server in compressed form, which may be called the application configuration profile (ACP).

In some example embodiments, there are several different types of configuration files stored in the application configuration profile. The first, called "META-INF", may contain versioning related metadata. This may include a file called MANIFEST.MF, which is a manifest file used by the mobile platform server.

The second type of configuration files are tiles. In some example embodiments, tiles may be expressed in extensible markup document (XML) form. Files may include layout_phone.xml, which provides an extensibility configuration file for phone or phone-like devices (such as MP3 players), and layout_tablet.xml, which provides an extensibility configuration file for tablet devices.

The third type of configuration files are styles, which may include style.xml, a styling configuration file.

The fourth type of configuration files are image files. These contain the static images used by the application, organized by platform. Thus, image files for multiple different platforms can all be stored in the library and the device may simply just use the files corresponding to its platform. For example, a platform called "IOS" may contain images specific to the iOS platform. Subfolders may contain images specific to specific devices within that platform such as for example iPhone and iPad. In some example embodiments, native naming conventions may apply. For example <filename>.png may be used for low-resolution images in the iOS platform, and <filename>@2x.png may be used for hi-resolution images in the iOS platform. For android devices, subfolders within an android image folder may contain images specific to the density of the android device. For example LDPI may contain images specific to low density android devices. MDPI may contain images specific to medium density android devices, and so on.

The fifth type of configuration files are strings. Strings may contain localized text strings, one file per locale. In some example embodiments, filenames may follow this format localization.<language code>.xml.

The sixth type of configuration files may be called "ext." This may include configuration files needed by the application. The entry names may be defined by the application. The developer can place any kinds of files in this directory. Although the framework does not process files in the ext folder, it exposes the APIs needed to retrieve their content.

The seventh type of configuration files may be demos. These may contain off-line data used by the application in demo mode.

These types of configuration files may represent only a small portion of the possible types of configuration files available to the system and are only intended as examples. Other embodiments may be possible where some but not all of the above types of configuration files are used, either in lieu of or in conjunction with other types of configuration files not listed here.

The mobile application framework enables rapid development of mobile applications using a common set of services and a consistent approach. It also allows for sustainable development of packaged applications by providing developer extensibility in a declarative manner via configuration, such as without the need for access to source code, in turn allowing for easy upgrades of the application.

Much of this disclosure will focus on the client side of the extensibility. It may be assumed that a valid, consistent, and correct configuration is available on the client device and can be accessed by the client, on occasion. Further, it is assumed that all relevant libraries are bound to the application and that the functionality is available. While this disclosure makes these assumptions, these assumptions are not intended to be limiting and, in fact, it is possible that in some implementations one or more of these assumptions may not be correct.

The mobile application framework supports a scenario in which an application developer is implementing a concrete application that performs a particular business process. The mobile application framework also supports a scenario in which a developer or partner applies specific extensions to a mobile application. In the first scenario, the application development team may have access to the framework API and is even able to add specific classes which implement the application and its specified behavior. Hence, the application can provide its own custom implementation to override certain default framework functionality. The application then may keep the control and responsibility as desired. In the second scenario, developers may be supported to enhance the application in a structural way. This means that developers can change the layout of the screen, add new fields or entire screens, plus add the specified navigation to the new screens. However, the framework may not support the definition of new behavior logic, also known as behavior extensibility. In some embodiments, however, such behavior extensibility may be supported.

When building an application using the mobile application framework, there are many different development possibilities. A developer can choose to build an application fully using metadata definition. A developer can choose to build an application partially using metadata definition and partially using custom code. A developer can choose to build a fully custom application that uses the configuration extensions provided in the mobile application framework and provisioning infrastructure.

As described herein, the mobile application framework allows developers to configure the application without access to code or the need to recompile. The application developer can integrate the framework to make use of the extensibility capabilities.

As described herein, the mobile application framework (MAF) includes a variety of tools and components, including re-usable components 204 (e.g., the logon manager 220), structural extensibility, and other tools. The MAF provides customizable, prepackaged building blocks for mobile applications, designed to assist in the development of mobile applications. For example, a developer may utilize MAF to build new applications, to upgrade and customize MAF-based standard mobile applications to a company's needs (without modifying the source code), by setting the branding, logos, and terminology and/or adding or deleting screen sections by configuring the application (and not by coding the application).

In some example embodiments, the logon manager 220 manages common logon-related tasks, such as registering and deleting users, updating configuration, locking and unlocking applications, changing application passcodes, and securely handling passwords. The logon manager 220 may be based on re-usable controls, including a default UI that is skinnable for different applications.

MAF reusable controls enable developers to utilize native iOS UI controls (such as buttons and labels) that display a default style, taken from a prebuilt library. The developers may skin these components at runtime to match developer branding, without recompiling the source code. The MAF also contains a set of complex controls, such as a calendar, a tree view, and locale-aware controls. These complex controls, which provide additional runtime skinning capabilities, may be built from the simple MAF controls.

Examples of Developing Mobile Applications

As described herein, in some example embodiments, the logon manager 220 includes and/or performs various functions, including facilitating and completing user-initiated registration requests to specified security infrastructures and/or via specified communication scenarios, the locking and unlocking of applications to protect credentials and other sensitive information, the changing of application back-end passwords to enhance security within an enterprise environment, the customization of user interfaces and other components, and so on.

Figure 3:
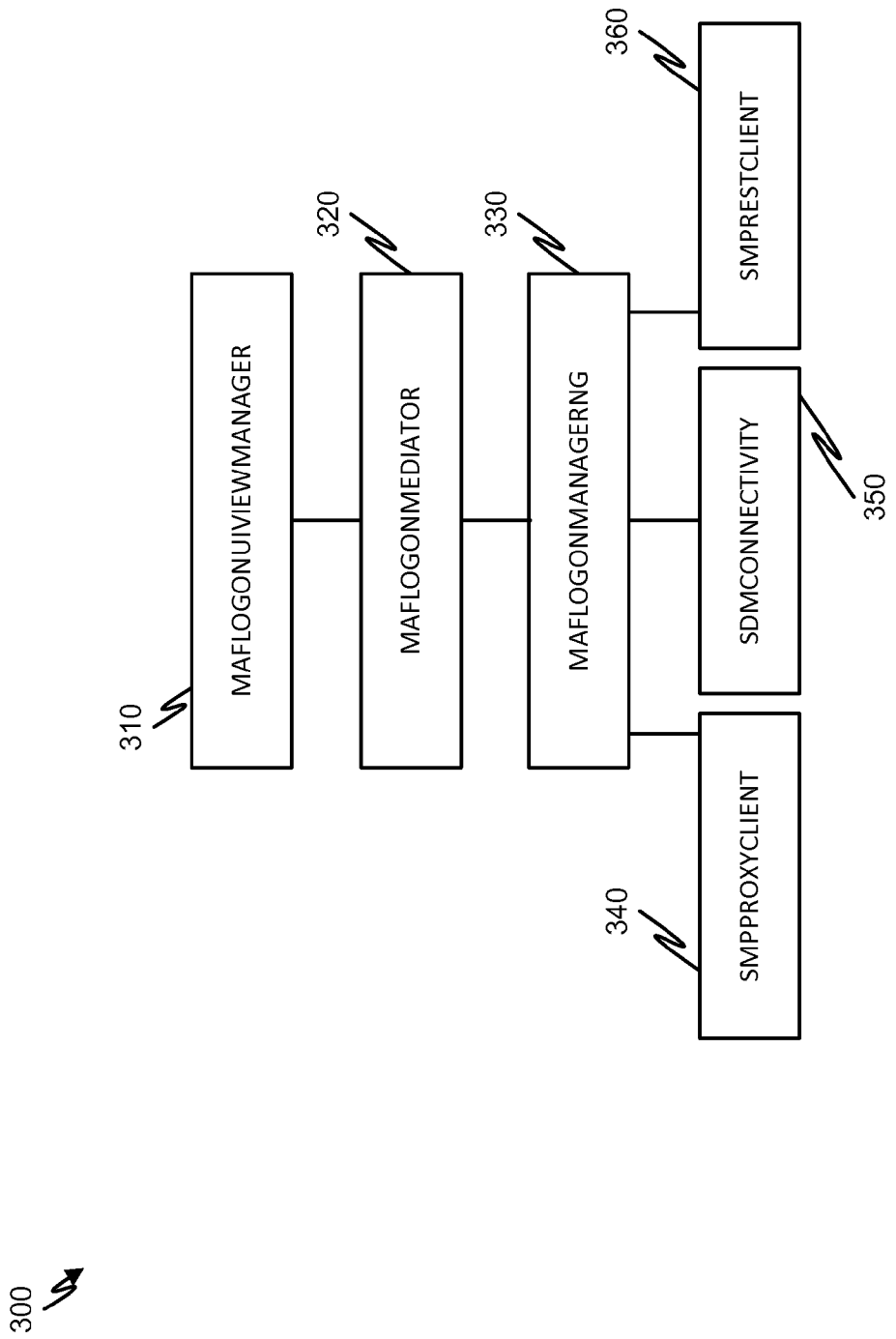
FIG. 3 is a block diagram illustrating a system, in accordance with an example embodiment, including a logon manager.

FIG. 3 is a block diagram illustrating the architecture of a logon manager 300, in some example embodiments. The logon manager 300 includes various components, including a MAFLogonUIViewManager 310, a MAFLogonMediator 320, and a MAFLogonManagerNG 330, among other components, and utilizes some or all components to support onboarding, among other things.

For example, the logon manager 300, or MAFLogonUING, provides an out-of-the-box logon user interface that uses the default implementation of the MAFLogonUIViewManager 310. This class handles navigation between various logon screens using a MAFLogonUIContextViewManager, which builds dynamic screen content from Context objects, such as MAFLogonUIContext objects that describe general screen data, such as header, footer, groups, fields, and action items. The information about the screen is delivered in an array of objects. A MAFLogonMutableArrayHelper handles arrays without a type as typed objects, or NSMutableArray objects.

The MAFLogonMediator 320 creates the content of this array. The logon manager 300, via the MAFLogonManagerNG 330, provisions the logon UI to present all the necessary information to execute the next step of a selected process. The logon process may receive challenges, such as an authentication challenge, from the server. In some example embodiments, the MAFLogonMediator 320 may need additional information from the application. To get the information, the MAFLogonMediator 320 issues a new UIContext object and passes it to the logon UI. The logon UI may then present it to the device end user, who provides the missing information. The input provided by an end user is handled in other context objects, such as the MAFLogonOperationContext, the MAFLogonChallengeContext, and so on.

The logon manager 300 presents logon screens on a device, providing easy integration for applications that use default logon UI behavior. While the logon manager 300 (e.g., via the MAFLogonUING) constructs a dynamic UI from context elements, the MAFLogonManagerNG 330 executes operations and constructs UI contexts to be presented by the MAFLogonUING. Thus, in some example embodiments, the MAFLogonManagerNG 330 handles all UI-related configurations. The MAFLogonManagerNG 330 also handles various communications with client devices, such as IMO communications with a SMPProxyClient 340, HTTPRest/Cloud communications with a SMPRestClient 350, and/or Gateway/ping communications with a SDM Connectivity client 360.

Figure 4:
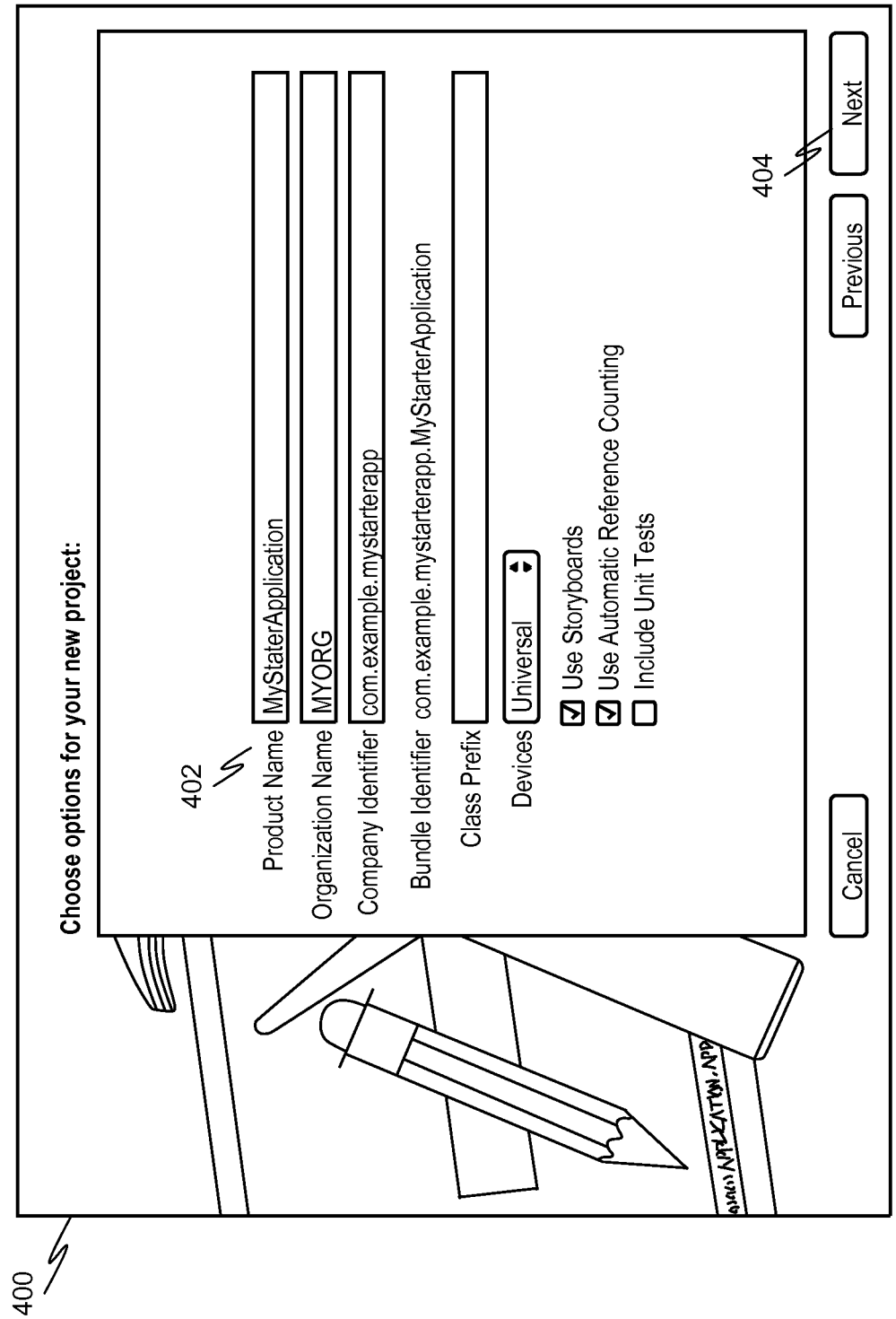
FIG. 4 is a screen shot of a project selection page of a mobile application development tutorial, in accordance with an example embodiment.

To begin, a developer can create a new Xcode project. FIG. 4 is an example screen shot of a project selection page 400 of a mobile application development tutorial in accordance with an example embodiment. From the project selection page 400, the developer selects a new project by selecting File menu→New→Project, and a "Choose a template for your new project" modal view appears. The developer selects the "Single View Application" template, and clicks "Next". The developer specifies the project details 402 on the project selection page 400, clicks "Next," 404 specifies a place to which the starter application will be saved, and clicks "Create," which can open a new project.

Figure 5:
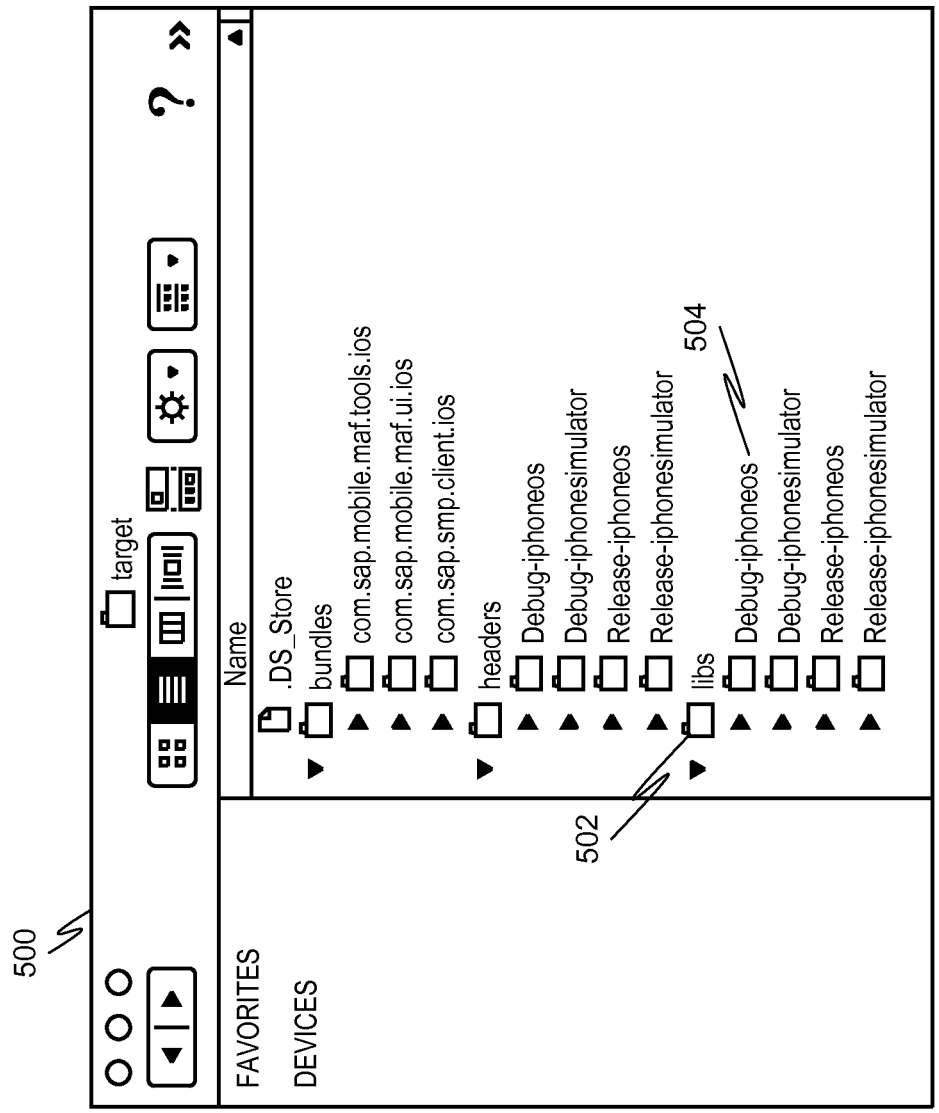
FIG. 5 is a screen shot of project libraries for a mobile application development tutorial, in accordance with an example embodiment.
Figure 6:
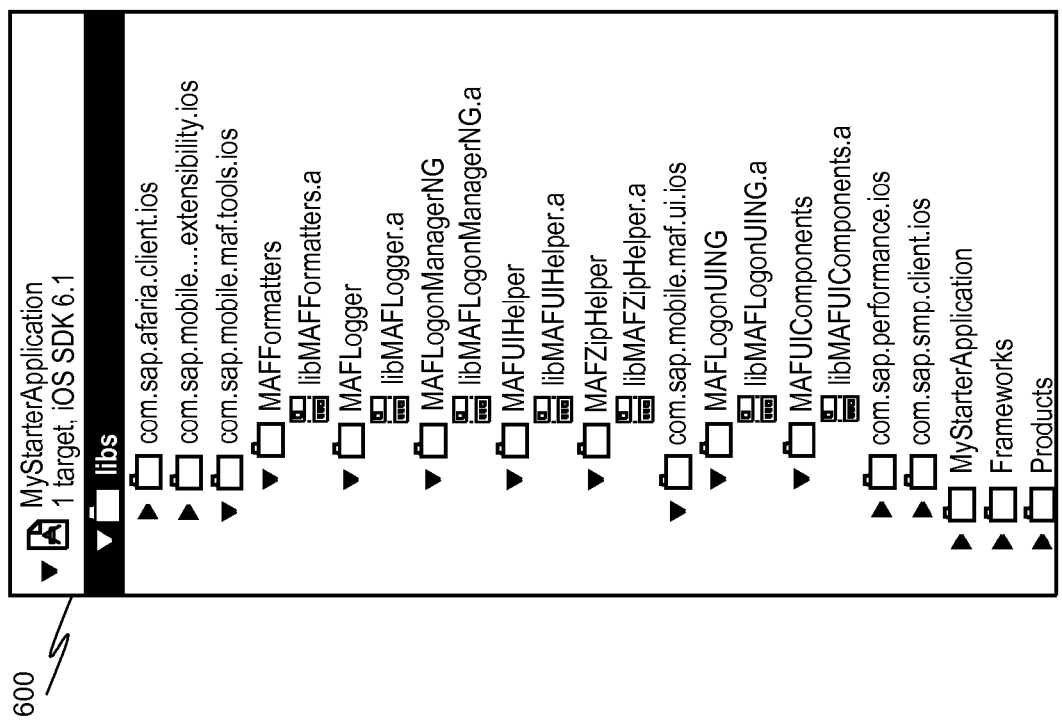
FIG. 6 is a screen shot of a folder hierarchy for a mobile application development tutorial, in accordance with an example embodiment.

The developer now adds MAF libraries to the starter application, a view-based application project. The MAF may be provided in the form of statically linked libraries accompanied by resource bundles. The libraries are located in the installation folder created by a mobile platform software development kit (SDK) installer. FIG. 5 is an example screen shot 500 of project libraries for a mobile application development tutorial, in accordance with an example embodiment. The developer can add all libraries from the libs 502 folder to the project. In this example, there are four distinct versions of the libraries, because they are built for two platforms (e.g., iphoneos and iphonesimulator), and both for Debug and Release. The developer may add one set of these libraries, and xcode can search the correct version for the current build setup. For example, the developer may select the Debug-iphoneos version 504. The developer then can copy all of the client side mobile platform libraries into a folder called dependencies in the root of the project. In order to add the libraries, the developer may drag and drop them into the xcode windows of the Project Navigator view of the project, resulting in a similar folder structure in the Project Navigator view. FIG. 6 is an example screen shot 600 of a folder hierarchy for a mobile application development tutorial, in accordance with an example embodiment.

At this point, the developer may repeat the above to add various dependencies. The developer may adjust the Library and Header search paths, by selecting the project in the Project Navigator view, selecting the build settings tab in the main area of xcode (ensuring that All settings is selected and not filtered to Basic settings only), and searching for "Search Paths" in the search field.

For example, the developer may specify the following string as the Header search path: "$(PROJECT_DIR)/dependencies/headers/$(BUILD_STYLE)-$(PLATFORM_NAME)/" and specify the following string as the Library search path: "$(PROJECT_DIR)/dependencies/libs/(BUILD_STYLE)-$(PLATFORM_NAME)/" Thus, the xcode is able to select the correct library for the current build setup. The developer may set other linker flags to "-all_load-ObjC," which is located in the build settings of the project.

In order to build the project, the developer adds the following ObjC frameworks: MessagUI.framework, SystemConfiguration.framework, Security.framework, QuartzCore.framework, MobileCoreServices.framework, Libz.dylib, Libstdc++.dylib, CFNetwork.framework, UIKit.framework, Foundation.framework, and CoreGraphics.framework.

In some example embodiments, the view controller (MainViewController.m) is responsible for setting the self reference as the partenViewController property of the MAFLogonUIViewManager 310. The Logon UI is presented using the parntViewController reference whenever needed, among other things. The project may be run to see the default MAF logon UI, which is presented because the logon selector on the Logon Manager is called from the appdelegate when the application became active.

Figures 7A, 7B, 7C:
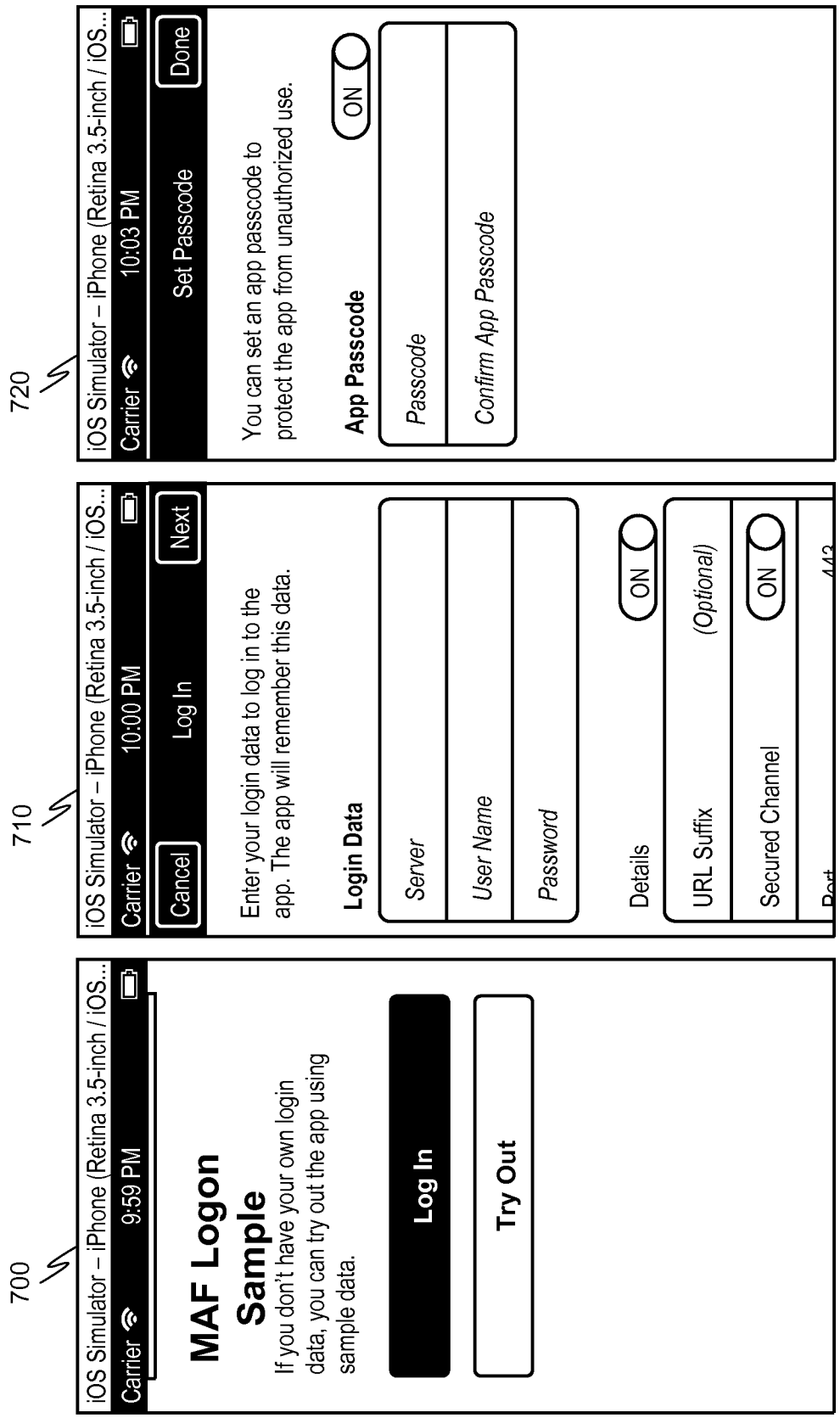
FIG. 7A is a screen shot of a login entry screen for a mobile application, in accordance with an example embodiment.
FIG. 7B is a screen shot of a login credential input screen for a mobile application, in accordance with an example embodiment.
FIG. 7C is a screen shot of a passcode setting screen for a mobile application, in accordance with an example embodiment.

For example, FIG. 7A is an example screen shot 700 of a login entry screen for a mobile application, FIG. 7B is an example screen shot 710 of a login credential input screen for a mobile application, and FIG. 7C is an example screen shot 720 of a passcode setting screen for a mobile application, in accordance with an example embodiment. These screen shots depict, for example, the default MAF logon user interfaces.

Once the MAFLogonUIViewManager 310 is initialized, the MAFLogonUIViewManager 310 presents the MAF logon UI screens. The View Manager maintains a reference to the MAFLogonMediator 320 (which, in the code examples, may also be called a logon manager). To present a particular screen, it calls the corresponding operation on the MAFLogonMediator 320, which notifies the View Manager of the MAFLogonUING that the action calls for input. The View Manager generates and presents the input screen. The View Manager then calls back the MAFLogonMediator 320 in the MAFLogonManagerNG 330 and executes the next step of the requested operation.

To present the logon screen, it calls the MAFViewManager logon method, such as:

```
// call this method from any place in your application code
- (void)doLogon {
    [logonUIViewManager.logonManager logon];
}
```

Figures 8A, 8B:
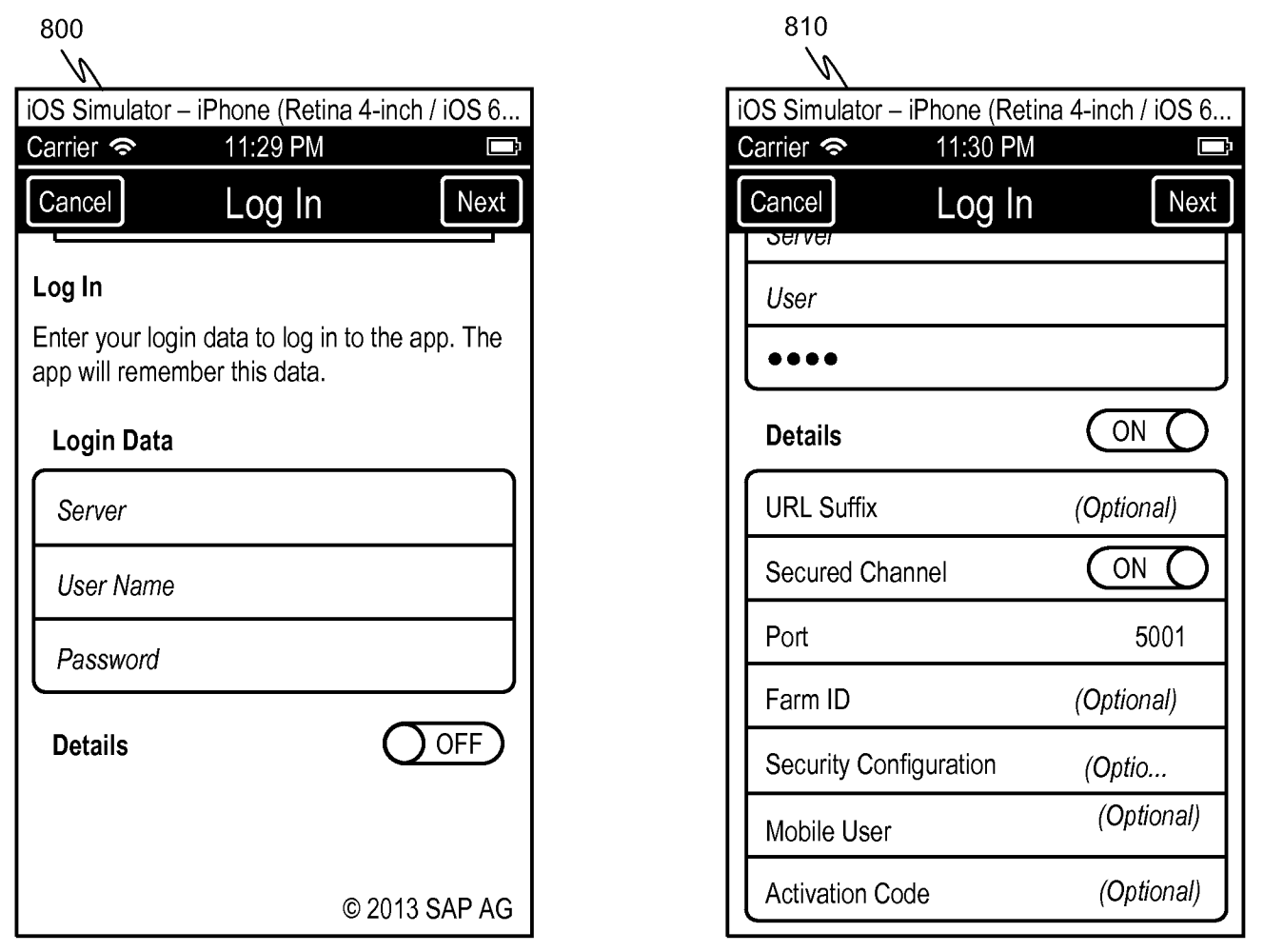

This call presents the default logon screen, shown in FIGS. 8A-8B. For example, FIG. 8A depicts an example logon screen 800 and FIG. 8B depicts a more detailed logon screen 810, in accordance with an example embodiment.

A user may enter input that corresponds to a selected onboarding scenario, such as a scenario facilitated by screen 800 or 810. The user taps or selects the Log In button to trigger the registration process, with the following outcomes: the request fails with an error message, the registration succeeds and the success delegate is called on MAFLogonNGDelegate, and/or the registration succeeds and the App Passcode screen is presented.

As described herein, the The MAFLogonManagerNG 330 provides a build-time configuration of the structure and content of the MAF logon UI. For example, it may facilitate hiding the advanced registration section, hiding each field individually, setting a default value for each field individually, and so on. Users cannot change the default values of hidden fields, but the onboarding process uses these values.

Figure 9B:
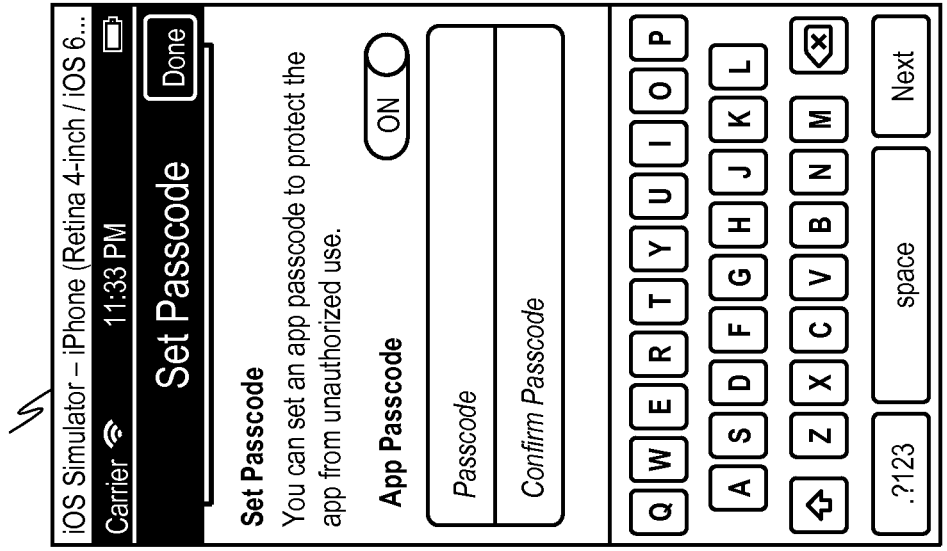
FIGS. 9A-9B are screen shots of passcode setting screens for a mobile application, in accordance with an example embodiment.
Figure 9A:
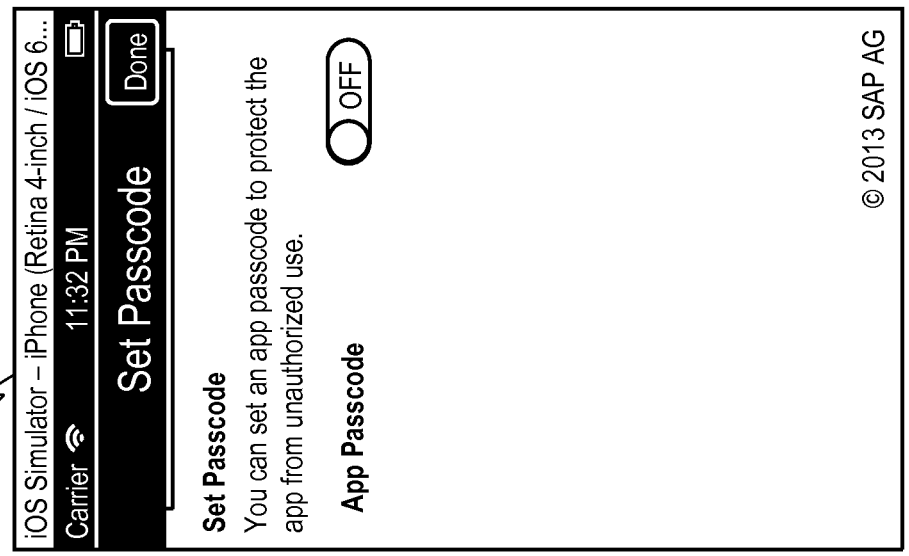

Upon a successful registration in one of the scenarios, the device user sees a Set Passcode screen 900 or 910, as shown in FIG. 9A or 9B. In some example embodiments, this is the second screen of the logon process (unless the configuration prohibits the usage of app passcodes, or if the password policy is disabled on a Mobile Platform). The password policy may be set for the application connection template on the Mobile Platform server by the IT administrator. The confirmation may match the app passcode, and the app passcode may match the password policy. The screens 900 or 910 appear when the password policy is enabled. For example, the MAFLogonUING checks the password policy and presents the screen as appropriate.

In order to delete registration information from the device, the deleteUser operation is called, as follows:

```
// call this method from any place in your application code
- (void)doDelete {
    [logonUIViewManager.logonManager deleteUser];
}
```

For example, when the logon manager's 300 deleteUser method is called, the Delete Registration Confirmation UIAlertView is presented.

To close the secure store and present an App Passcode Unlock screen, lockSecureStore is called from the application, as follows:

```
// call this method from any place in your application code
- (void)doLockSecureStore {
    [logonUIViewManager.logonManager lockSecure Store];
}
```

To update the secure store passcode, an App Passcode Change screen is presented, as follows:

```
// call this method from any place in your application code
- (void)doChangeAppPasscode {
    [logonUIViewManager.logonManager changeSecureStorePassword];
}
```

Figure 10B:
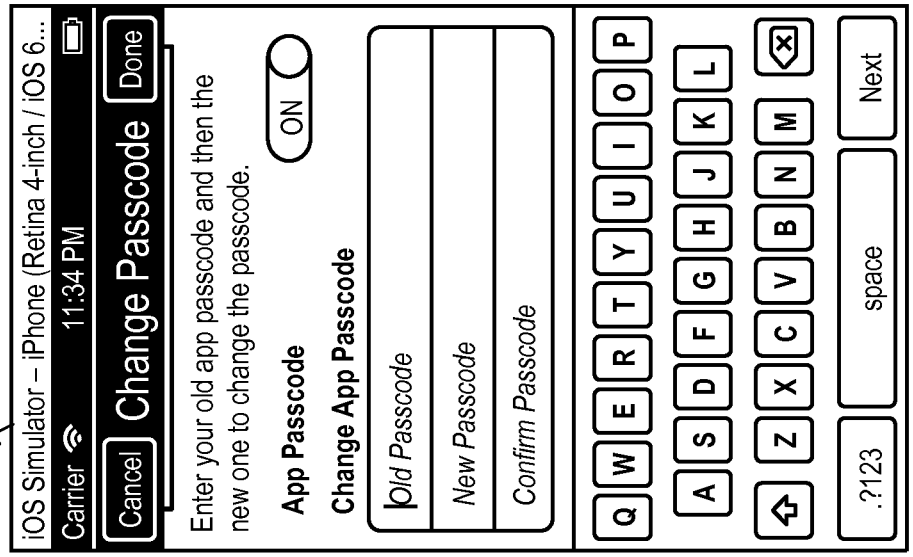
FIGS. 10A-10B are screen shots of passcode changes screens for a mobile application, in accordance with an example embodiment.
Figure 10A:
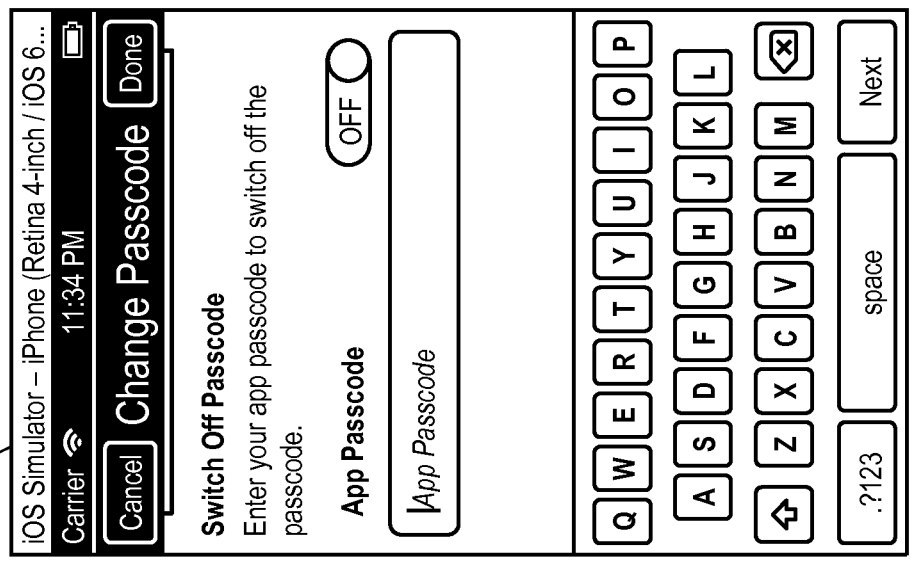

FIGS. 10A-10B depict screen shots of passcode change screens 1000 and 1010 in accordance with an example embodiment.

When device users change their back-end passwords, MAFLogonManagerNG 330 gets new passwords, as follows:

```
// call this method from any place in your application code
- (void)doChangeBackendPassword {
    [logonUIViewManager.logonManager changeBackendPassword];
}
```

Figure 11:
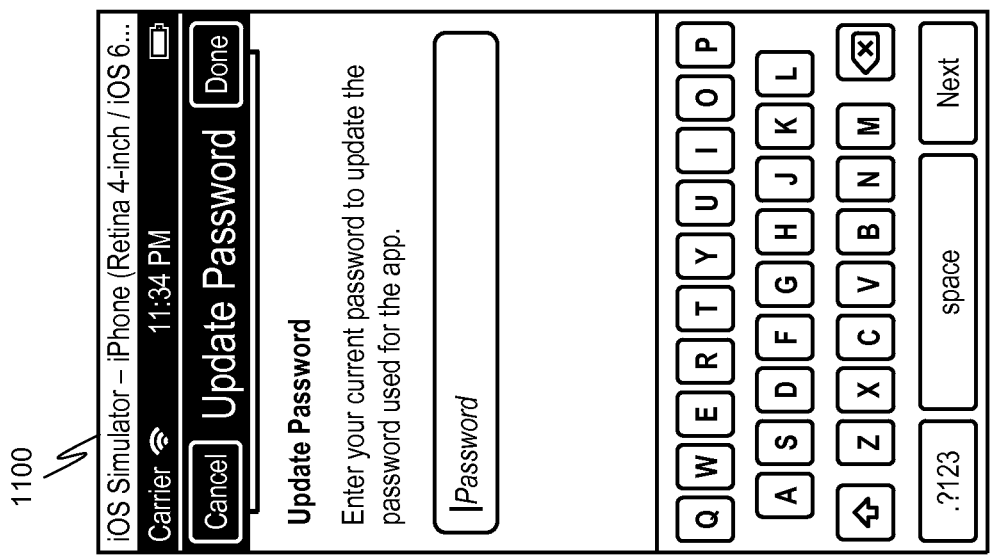
FIG. 11 is a screen shot of a password update screen for a mobile application, in accordance with an example embodiment.

FIG. 11 depicts a screen shot of a password update screen 1100 in accordance with an example embodiment.

To review registration information, the Login Data screen is presented by executing the Login Data operation, as follows:

```
// call this method from any place in your application code
- (void)doPresentRegInfo {
    [logonUIViewManager.logonManager registrationInfo];
}
```

Figure 12:
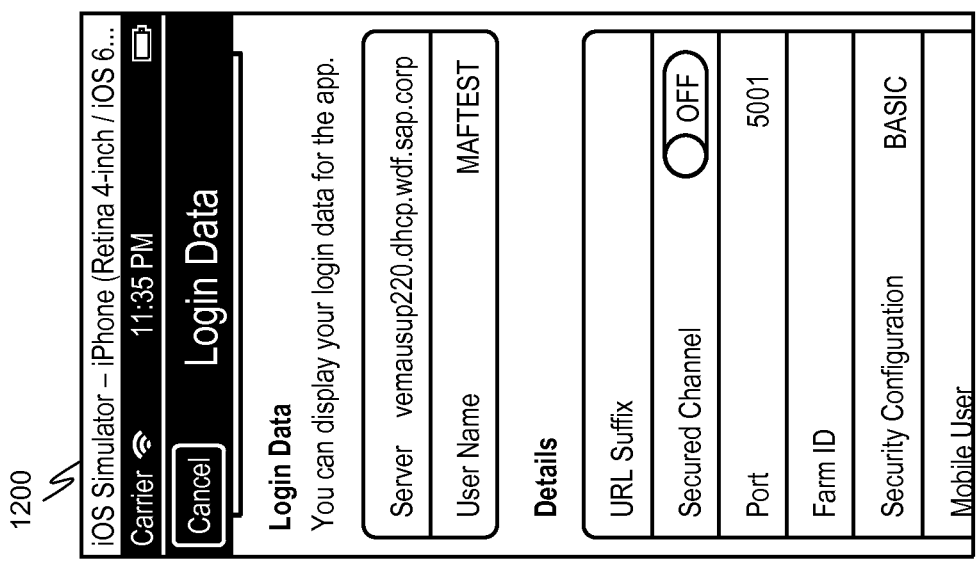
FIG. 12 is a screen shot of a login data screen for a mobile application, in accordance with an example embodiment.

FIG. 12 depicts screen shot of a login data screen 1200 in accordance with an example embodiment. The login data screen 1200 displays (e.g., in read-only mode), in some example embodiments, every input to the login screen (e.g., screens 800 or 810) during registration.

After registration is completed and a secure data store is initialized, the application may request data from the back end.

In some example embodiments, registration data is fetched from MAFLogonManagerNG 330 rather than getting username, password and enpointurl directly from the Secure Store (mobile platform data vault). This may be done by implementing a call to the logonManager class referenced by the MAFLogonHandler object.

Once the MAFLogonRegistrationData object is obtained, the application may use its content to construct various types of SDM requests and set their properties before triggering them. The applicationConnectionId property can be used to set the SDM request type according to the type of the registration.

Once set up correctly, the SDMRequestBuilder may be used as usual to create a request object. The application may set the request object's properties based on the content of MAFLogonRegistrationData.

In some example embodiments, the MAF supports mutual certificate based data requests. In order to execute requests with certificates, the application may set an identity into the mobile platform RequestManager, and gets an identity from the MAF Logon after the registration has been finished:

```
SecIdentityRef identity = nil;
[logonUIViewManager.logonManager getClientIdentity:&identity
    error:&localError];
```

Once an identity from MAF Logon Manger is received, the application may set it to each Request before starting it, as follows:

```
if (identity!=nil) {
    [request setClientCertificateIdentity:identity];
}
```

Once completed, and providing that all the configuration prerequisites are met, the request can execute and authenticate with the certificate, based on the following prerequisites: the user creation policy is set to certificate, and the mobile platform server-side security configuration used during registration is set to support Mutual Certificate Handling.

In some example embodiments, the MAFLogonUING notifies applications about the result of each MAFLogonManagerNG 330 operation it executes. The MAFLogonNGDelegate protocol may be implemented by an application's View Controller.

In some example embodiments, the MAFLogonManagerNG 330 communicates errors using iOS-standard NSError objects. If the passed NSError object is not nil, an error is generated. The MAF provides an error-handling method for these; the NSError instance contains the localized error description, the error domain, and the error code.

Figure 13:
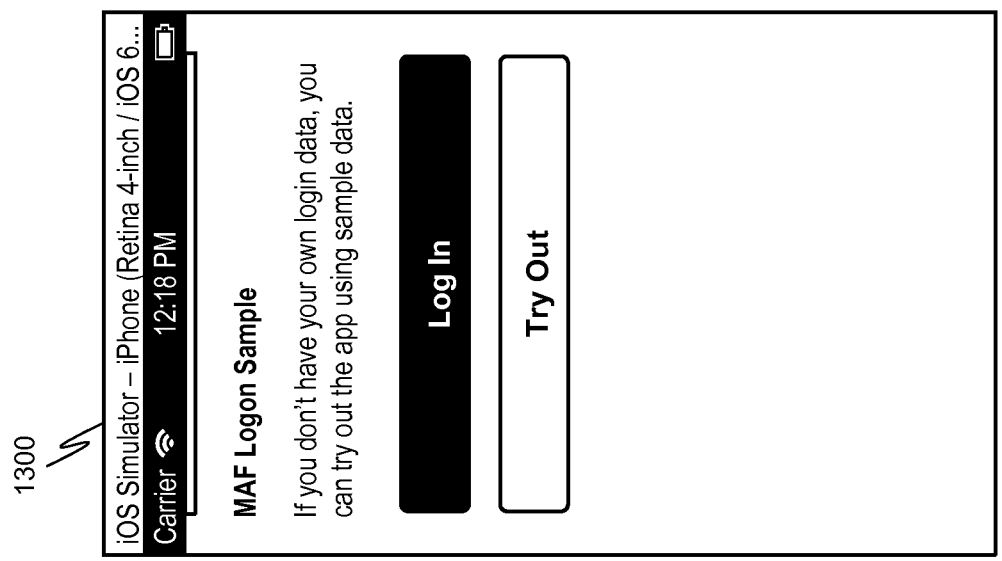
FIG. 13 is a screen shot of a customized login screen for a mobile application, in accordance with an example embodiment.

In some example embodiments, to customize header and footer views for any MAF logon UI screens, the MAFLogonUING is used. FIG. 13 is a screen shot of a customized login screen 1300 for a mobile application, with a custom header and footer, in accordance with an example embodiment.

In some example embodiments, the MAFLogonUING calls the willRenderHeaderFooterFromCustomContext method when it presents the screen, allowing the developer to set any UIView content in these properties.

In some example embodiments, to change the behavior of the MAFLogonManagerNG 330, the feature and default values configuration files may be adjusted at build time. The plist format configuration files are located in the MAFLogonManagerNG.bundle folder, where plist is an XML format that can be adjusted in Xcode or in any text editor, among other things.

Examples of Onboarding Via Various Communication Scenarios

As described herein, the MAFLogonManagerNG 330 supports multiple onboarding scenarios, based on the most common infrastructure setups supported by enterprise mobile applications, among other things. For example, a company IT of a developer may have a Mobile Platform installed and use a relay server to route Internet requests to intranet-hosted Gateway systems. As another example, the developer uses the Mobile Platform, but replaces the relay server with IIS or Apache, which is a reverse proxy server. The logon manager 300, via the MAFLogonManagerNG 330, enables the onboarding of an enterprise mobile application to these and other communication paths or scenarios, among other things.

Figure 14:
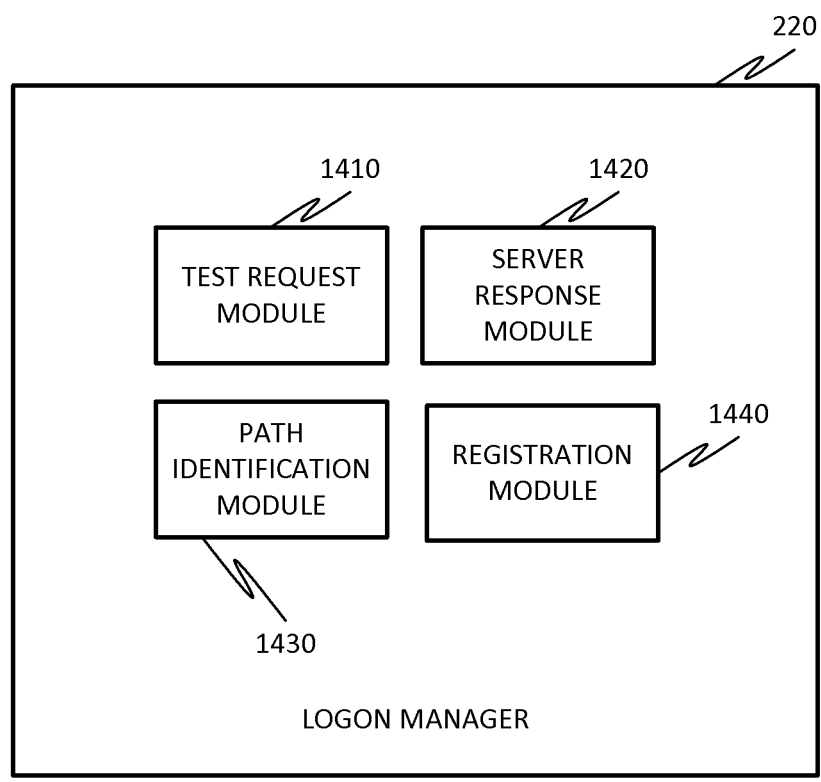
FIG. 14 is a block diagram illustrating a system, in accordance with an example embodiment, including a logon manager.

In some example embodiments, the logon manager 220 includes and/or performs various functions, including facilitating and completing user-initiated registration requests to specified security infrastructures and/or via specified communication scenarios, among other things. FIG. 14 is a block diagram illustrating a logon manager 220 in accordance with an example embodiment.

The logon manager 220 may include one or more modules and/or components to perform one or more operations of the logon manager 220. The modules may be hardware, software, or a combination of hardware and software, and may be executed by one or more processors. For example, the logon manager 220 may include a test request module 1410, a server response module 1420, a path identification module 1430, and a registration module 1440.

In some example embodiments, the test request module 1410 is configured and/or programmed to send a test request to a server configured to provide data to the mobile device application.

In some example embodiments, the server response module 1420 is configured and/or programmed to receive and/or access a response to the test request from the server.

In some example embodiments, the path identification module 1430 is configured and/or programmed to identify an available connection path between the mobile device application and the server based on content within the response to the test request.

In some example embodiments, the registration module 1440 is configured and/or programmed to register the mobile device application with the server via the identified connection path.

Figure 15:
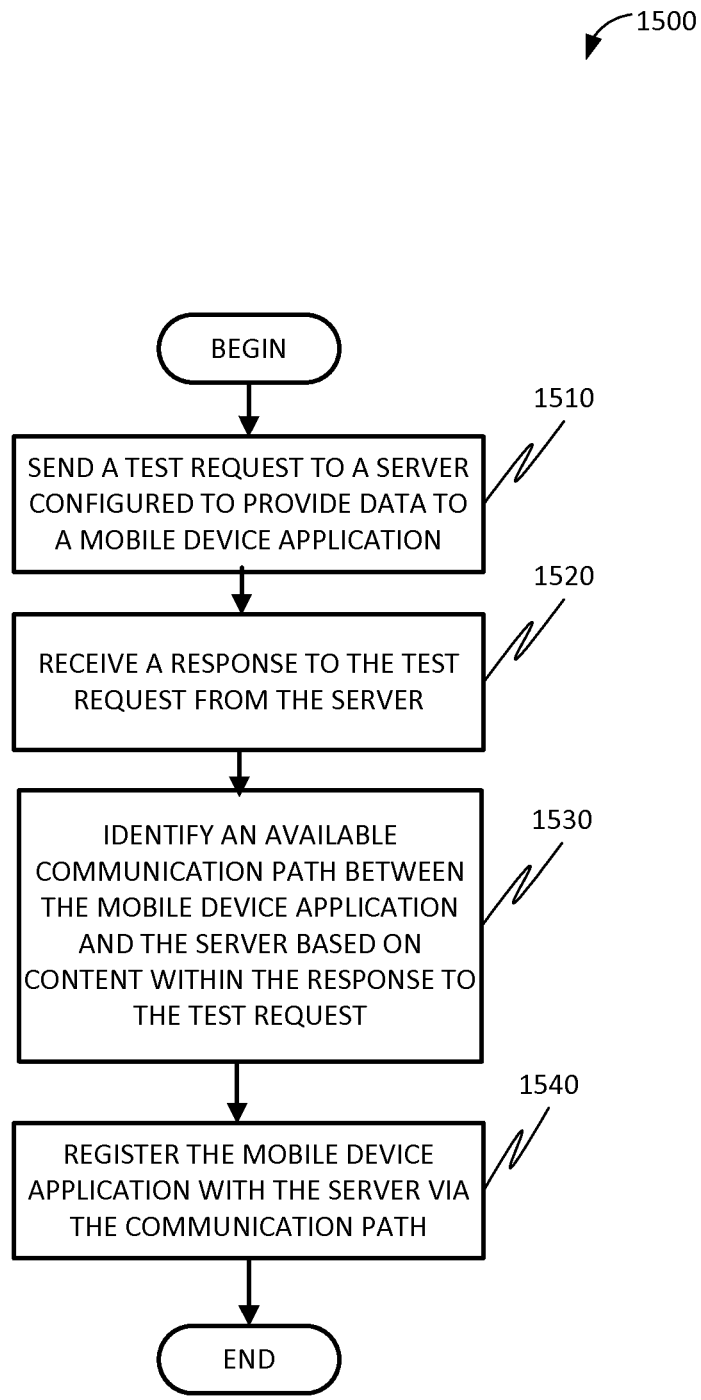
FIG. 15 is a flow diagram illustrating a method, in accordance with an example embodiment, of onboarding a mobile application.

As described herein, the MAFLogonManagerNG 330 may determine a target infrastructure or communication path with which to onboard a mobile application. FIG. 15 is a flow diagram illustrating a method 1500, in accordance with an example embodiment, of onboarding a mobile application. The method 1500 may be performed by the logon manager 220 or 300 and, accordingly, is described herein merely by way of reference thereto. It will be appreciated that the method 1500 may be performed on any suitable hardware.

In operation 1510, the logon manager 220 sends a test request to a server configured to provide data to the mobile device application. For example, the test request module 1410 sends a test request to the server that includes information from a plist file and/or a farmID for a known platform (e.g., a company or provider intranet platform), in order to identify the server as a Mobile Platform or Gateway, among other things.

In some example embodiments, an operation context object, which contains all information entered by the end user (e.g., plist information, farmID, and so on), passes the information to MAFLogonManagerNG 330 to initiate the request. Based on the information, the MAFLogonManagerNG 330 determines whether the device user wants to use a Mobile Platform server. For example, if the user provides a farmID, the logon manager 300 constructs and sends a Mobile Platform server communicator-based test request.

In operation 1520, the logon manager 220 receives a response to the test request from the server. For example, the server response module 1420 receives and/or accesses a response to the test request from the server that includes various types of information, including header information, code, cookies, and so on.

In operation 1530, the logon manager 220 identifies an available communication or connection path between the mobile device application and the server based on content within the response to the test request. For example, the path identification module 1430 identifies whether the available communication path or scenario is between the mobile device application and a Direct Gateway, a Direct Mobile Platform server, Mobile Platform server with relay server, a Mobile Platform server with third-party reverse proxy, and so on.

In some example embodiments, if the logon manager 220 may not identify the communication path (e.g., the MAFLogonManagerNG 330 cannot identify the communicator or server), the logon manager 220 generates an error. Additionally, MAFLogonManagerNG 330 may search for any information in the context and select a method based on some or all of this information. The context may have default values that are configured by the application developer, among other things.

In operation 1540, the logon manager 220 registers the mobile device application with the server via the identified communication path. For example, the registration module 1440 registers the mobile device application with the server via the identified connection path.

Figure 16:
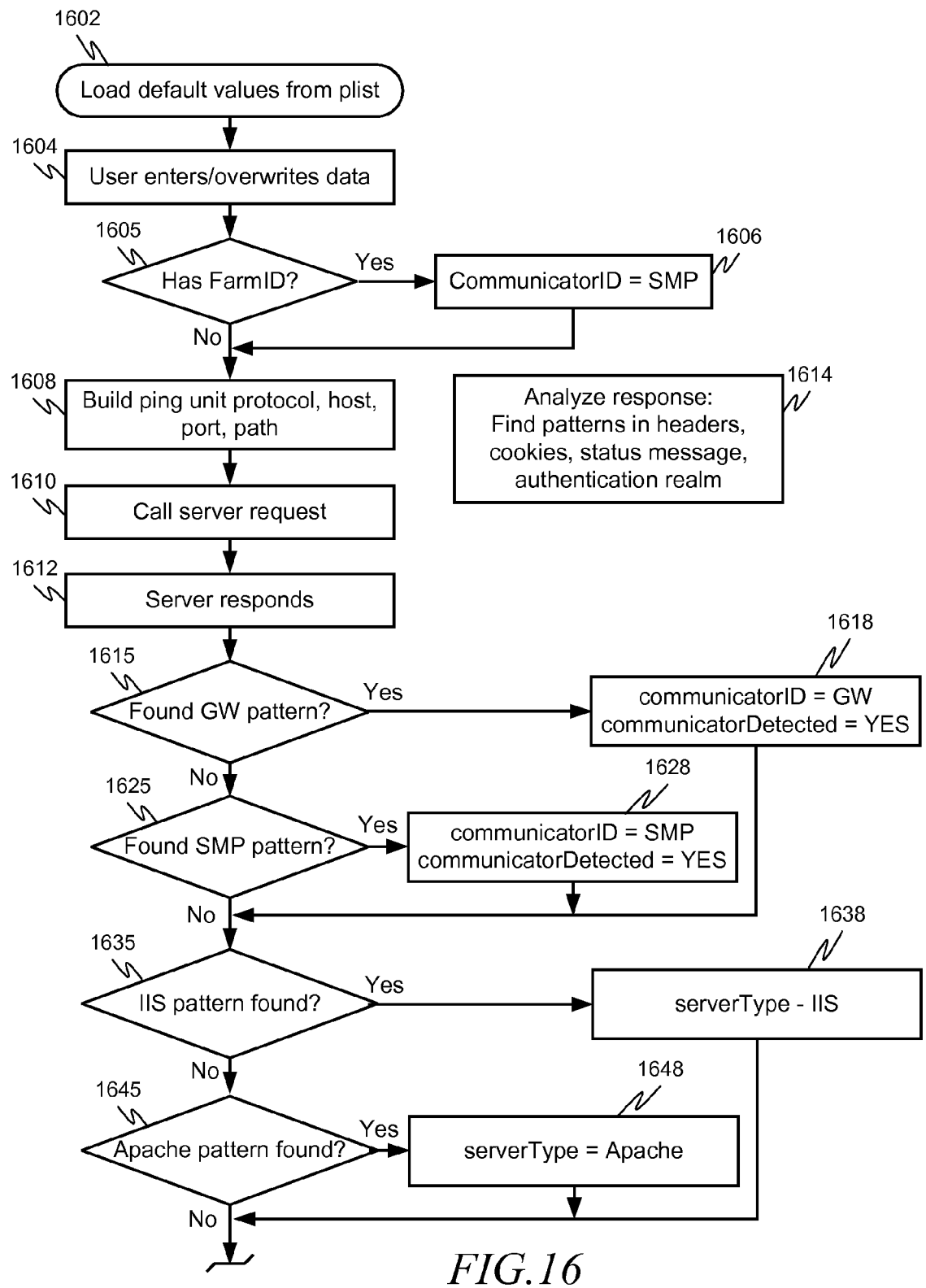
FIG. 16 is a flow diagram illustrating a method, in accordance with an example embodiment, of registering a mobile application with a server.
Figure 16:
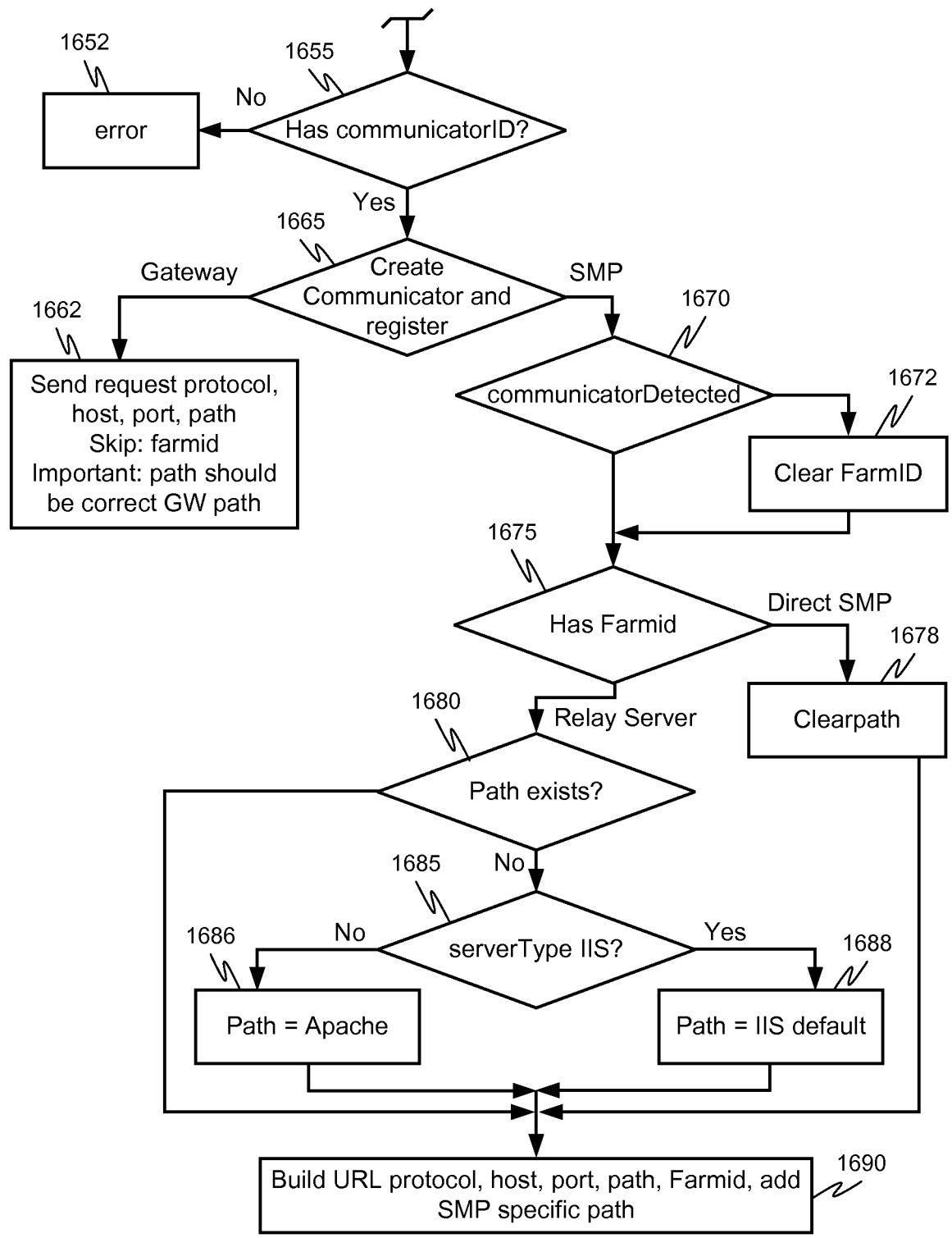

FIG. 16 is a flow diagram illustrating a method 1600, in accordance with an example embodiment, of registering a mobile application with a server. In operation 1602, the logon manager 220 loads default values from the plist. In operation 1604, a user enters and/or overwrites the loaded data, which is received by the logon manager 220. In operation 1605, the logon manager 220 determines whether the entered data includes a farmID, and in operation 1606, uses the farmID to identify a communicatorID as mobile platform data.

In operation 1608, the logon manager 220 build a test request, or ping url, which may include protocol information, host information, port information, path information, and so on. In operation 1610, the logon manager 220 calls a target server with the request. In operation 1612, the server responds and sends a response to the logon manager 220. In operation 1614, the logon manager 220 analyzes the response, such as by identifying and/or determining patterns or characteristics within the headers, cookies, status messages, authentication realms, or other portions of the response.

In operation 1615, the logon manager 220 determines if the response includes patterns associated with a gateway. If the patterns are associated with a gateway, the logon manager 220, in operation 1618, assigns communicatorID a gateway value (e.g., "GW") and the communicatorDetected a "yes" value, and proceeds to operation 1635. If the patterns are not associated with a gateway, the logon manager 220 proceeds to operation 1625, and determines if the response includes patterns associated with a Mobile Platform. If the patterns are mobile platform patterns, the logon manager 220, in operation 1628, assigns communicatorID a mobile platform value (e.g., "SMP") and the communicatorDetected a "yes" value, and proceeds to operation 1635. If the patterns are not mobile platform patterns, the logon manager 220 may still proceed to operation 1635, without assigning values for communicatorID or communicatorDetected.

In operation 1635, the logon manager 220 determines if the response includes patterns associated with an Internet Information Services (IIS) server. If the patterns are IIS patterns, the logon manager 220, in operation 1638, assigns serverType an IIS value (e.g., "IIS") and proceeds to operation 1655; else the logon manager 220 proceeds to operation 1645. In operation 1645, the logon manager 220 determines if the response includes patterns associated with an Apache server. If the patterns are Apache patterns, the logon manager 220, in operation 1648, assigns serverType an Apache value (e.g., "Apache"); else the logon manager 220 proceeds to operation 1655. In operation 1655, the logon manager 220 determines whether a communicatorID is determined.

If no communicatorID is determined (e.g., no patterns are identified), the logon manager 220, in operation 1652, returns an error message. If there is a communicatorID, the logon manager 220, in operation 1665, creates a communicator or communication path between the mobile application and the server identified by the communicatorID value and/or the serverType value.

For example, if the communicatorID="GW," which is indicative of a gateway communication path, the logon manager 220, in operation 1662, sends a request that includes protocol, host, port, and/or path information, and creates the communication path with the gateway server.

If the communicatorID="SMP," which is indicative of a known platform communication path, the logon manager 220, in operation 1670, determines whether there is a value for communicatorDetected. In operation 1672, the logon manager 220 clears a farmID, and in operation 1675, determines whether a farmID is known. If there is a farmID, the logon manager 220, in operation 1678, generates a direct mobile platform communication path, and in operation 1690, builds a URL protocol via the communication path.

When no farmID is determined in operation 1675, the logon manager 220, in operation 1680, determines if a relay server path exists. If the relay server path exists, the logon manager 220 generates a mobile platform relay server communication path, and in operation 1690, builds a URL protocol via the communication path.

In operation 1680, when no relay server path exists, the logon manager 220 determines if the serverType value is IIS. If the serverType value is IIS, indicative of an IIS reverse proxy server, the logon manager 220, in operation 1688, generates a mobile platform IIS reverse proxy server communication path, and in operation 1690, builds a URL protocol via the communication path. If the serverType value is Apache, indicative of an Apache reverse proxy server, the logon manager 220, in operation 1686, generates a mobile platform Apache reverse proxy server communication path, and in operation 1690, builds a URL protocol via the communication path.

Of course, the logon manager 220 may perform the operations depicted in FIG. 16 in a variety of different orders or sequences when determining a suitable onboarding scenario and/or communication path via which a mobile application onboards to a communicator.

Figure 17:
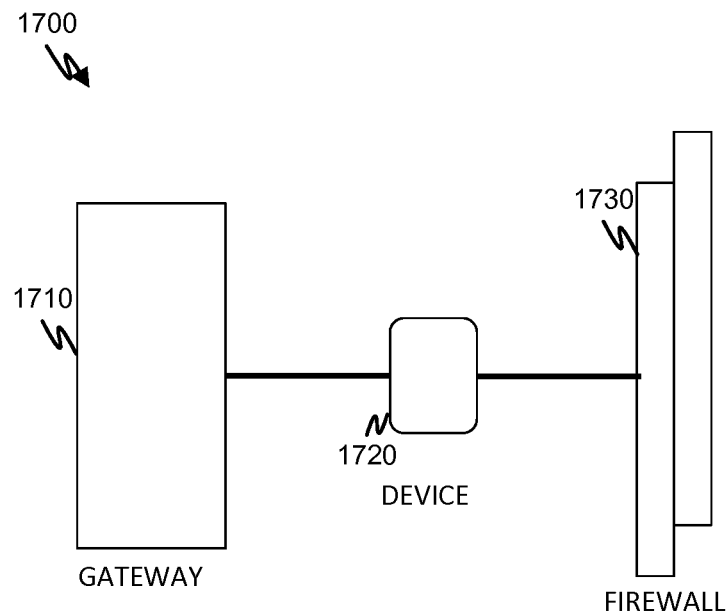
FIG. 17 is a block diagram illustrating a system, in accordance with an example embodiment, of an onboarding scenario having a platform.

As described herein, the MAF logon manager 220 supports multiple onboarding scenarios, based on the common infrastructure setups supported by enterprise mobile applications. Example scenarios include:

Scenario 1—The Direct Mobile Platform, as depicted in FIG. 17. FIG. 17 is a diagram illustrating a system, in accordance with an example embodiment, of an onboarding scenario 1700. For example, the direct Mobile Platform landscape contains a Gateway server 1710, a device 1720, and a firewall 1730. The Mobile Platform server is installed and configured to connect to the Gateway server 1710. Connections are accepted from the company intranet.

Figure 18:
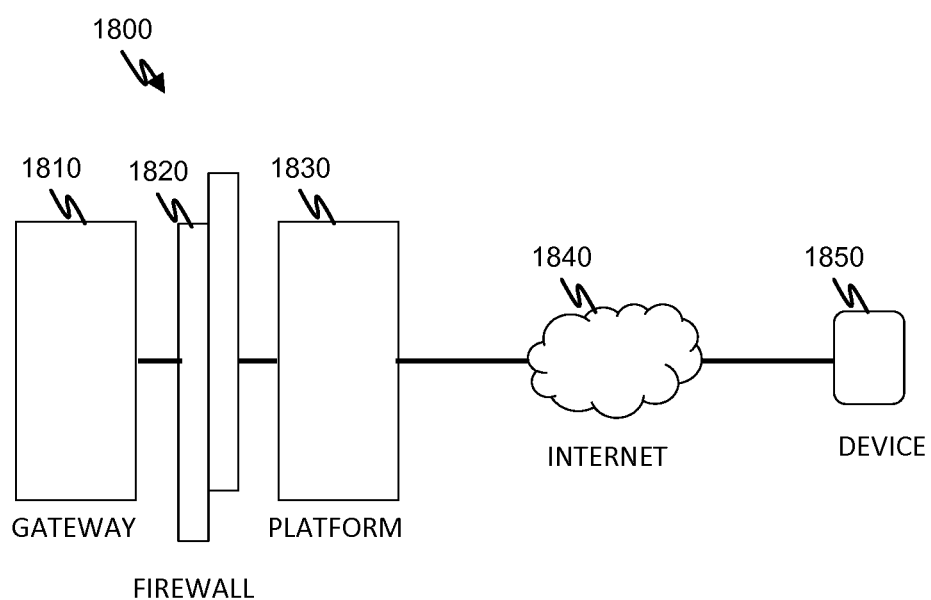
FIG. 18 is a block diagram illustrating a system, in accordance with an example embodiment, of an onboarding scenario having a cloud-based platform.

Scenario 2—The Cloud-Based Mobile Platform, as depicted in FIG. 18. FIG. 18 is a diagram illustrating a system, in accordance with an example embodiment, of an onboarding scenario 1800. The cloud-based Mobile Platform landscape is similar to the direct Mobile Platform scenario; however, the Mobile Platform server is installed in the cloud. For example, the scenario 1800 includes a gateway 1810 and a platform 1830 separated by a firewall 1820, which is accessed by a device 1850 via the Internet 1840.

Figure 19:
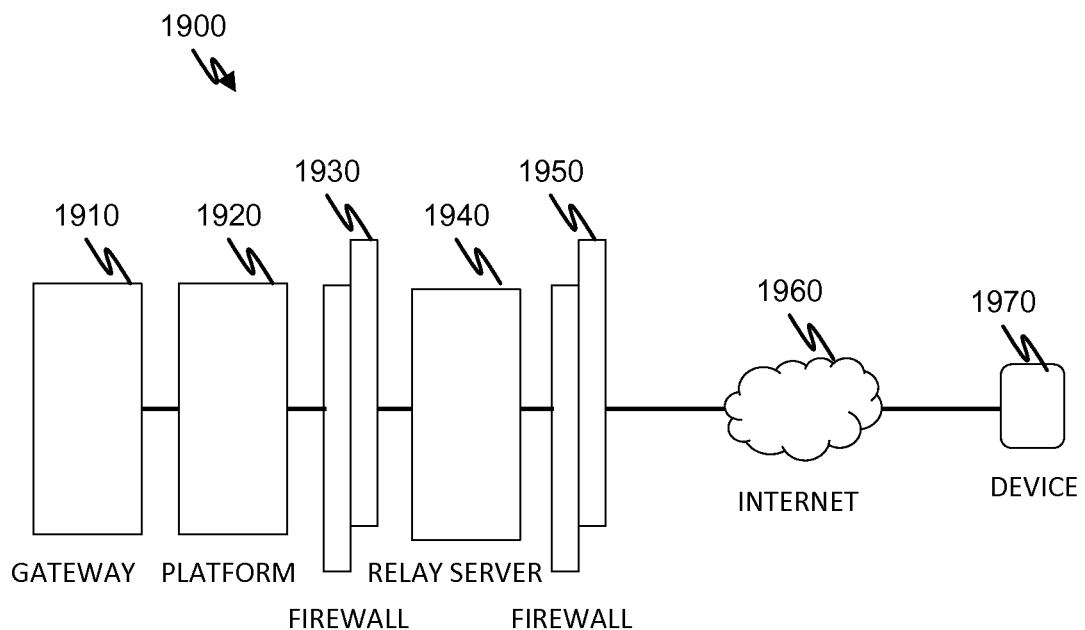
FIG. 19 is a block diagram illustrating a system, in accordance with an example embodiment, of an onboarding scenario having a platform and a relay server.

Scenario 3—The Mobile Platform with Relay Server, as depicted in FIG. 19. FIG. 19 is a diagram illustrating a system, in accordance with an example embodiment, of an onboarding scenario 1900. The Mobile Platform with relay server landscape is similar to the direct Mobile Platform scenario, but an application may access the Mobile Platform server from both the Internet and intranet. For example, a relay server 1940, in communication with a gateway 1910 and a platform 1920 via a firewall 1930, enables a mobile device 1970 to access the landscape from the Internet 1960 (via a firewall 1950).

In this scenario, an IT administrator may assign a Farm ID value to each user. The value of this field may match the relay server configuration, which enables the relay server to route requests from the mobile device 1970 to the platform 1920 configured to work with the particular mobile application.

By default, and for example, the secured connection (HTTPS) is ON, and is set to port 443. When the secured connection is off, the default port is 80. The relay server path may depend on how it is installed and configured.

Figure 20:
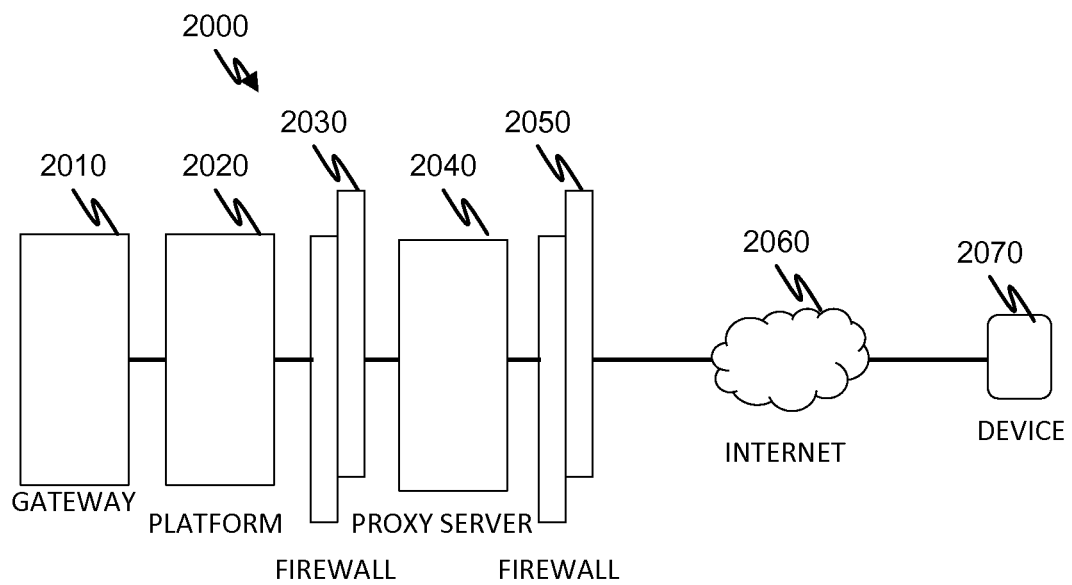
FIG. 20 is a block diagram illustrating, in accordance with an example embodiment, of an onboarding scenario having a platform and a proxy server.

Scenario 4—Mobile Platform with Third-Party Proxy, as depicted in FIG. 20. FIG. 20 is a diagram illustrating a system, in accordance with an example embodiment, of an onboarding scenario 2000. A Mobile Platform with third-party proxy landscape is similar to a Mobile Platform with relay server; however, it uses a third-party proxy server 2040 instead of the relay server. For example, a device 2070 connects, via the internet 2060, to a platform 2020 and gateway 2010, via the proxy server 2040, which is between a firewall 2030 and a firewall 2050.

Figure 21:
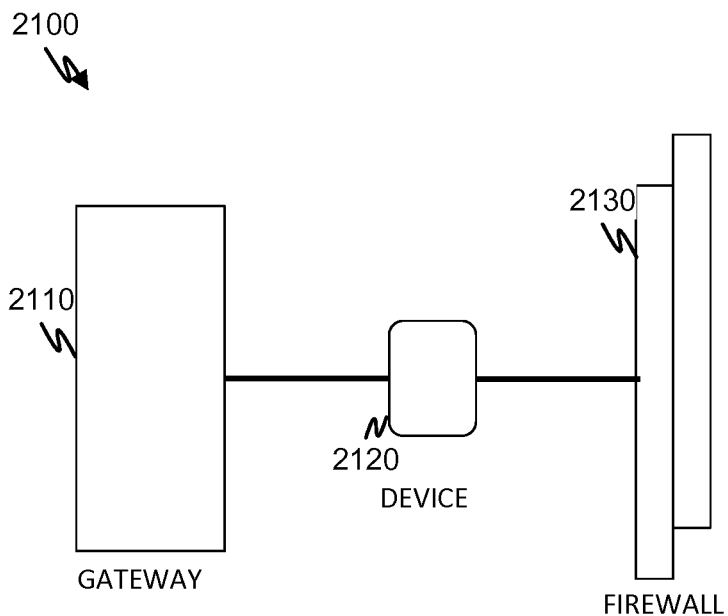
FIG. 21 is a block diagram illustrating, in accordance with an example embodiment, of an onboarding scenario having a direct gateway, in some example embodiments.

Scenario 5—The Direct Gateway, as depicted in FIG. 21. FIG. 21 is a diagram illustrating a system, in accordance with an example embodiment, of an onboarding scenario 2100. The direct Gateway landscape contains only the Gateway system, and restricts access to the intranet. A mobile device 2120 connects to a gateway 2110 within an intranet via internal Wi-Fi or through VPN, or otherwise within a firewall 2130.

Figure 22:
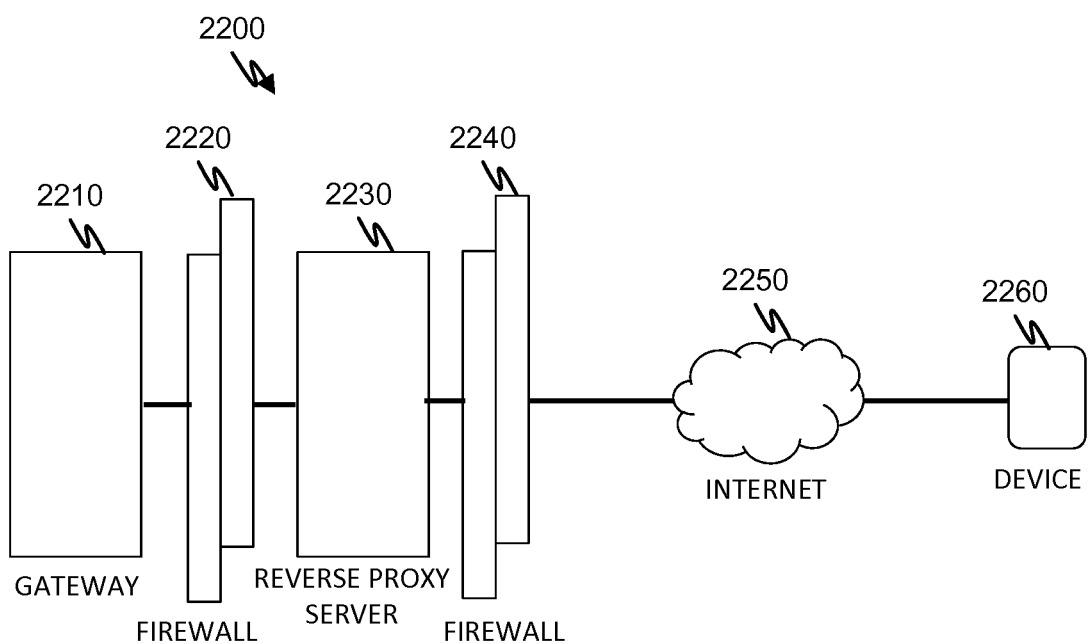
FIG. 22 is a block diagram illustrating, in accordance with an example embodiment, an onboarding scenario having a gateway and a reverse proxy server.

Scenario 6—The Gateway with Third Party Proxy, as depicted in FIG. 22. FIG. 22 is a diagram illustrating a system, in accordance with an example embodiment, of an onboarding scenario 2200. The Gateway with third-party proxy landscape contains a Gateway server 2210 that resides inside the company intranet (within firewall 2220), and a third-party reverse proxy server 2230 within a firewall 2240 that enables a mobile device 2260 to access the Gateway server 2210 from the Internet 2250.

In some example embodiments, the Gateway system is customized such that the MAF logon UI component (e.g., the logon manager 220) detects the direct Gateway setup. Also, back-end users may have authorization to access the Gateway systems ping URL, and the is/HTTP/show_server_header property may be enabled in SMICM transaction (ICM@SAPNetweaver).

As described herein, onboarding may include two processes or operations, including a registration process, where the MAFLogonManagerNG 330 uses input from the device user to contact a server and register with the server. For example, if registration is successful, the mobile application may send requests to the gateway server and obtain data.

In some example embodiments, onboarding includes the creation of a data vault on the user device, in which user credentials and other sensitive information or app data is securely stored. The logon manager 220 may secure data within the data vault with a passcode, such as a passcode that satisfies the requirements of a password policy.

Both of these steps may generate success and failure messages. Error messages are identified by an error code and an error domain, which fits into the iOS error message handling method.

If the Mobile Platform server is used, an Mobile Platform administrator may enable the password policy. If enabled, the user may satisfy each rule. If "Allow Default Password" is enabled in the password policy, the Set Passcode screen does not appear, but the user may enable the app passcode using the Change Passcode option, as described herein.

If the password policy is disabled, or if communication is not through the Mobile Platform, the MAFLogonManagerNG 330 applies the default password policy.

Figure 23:
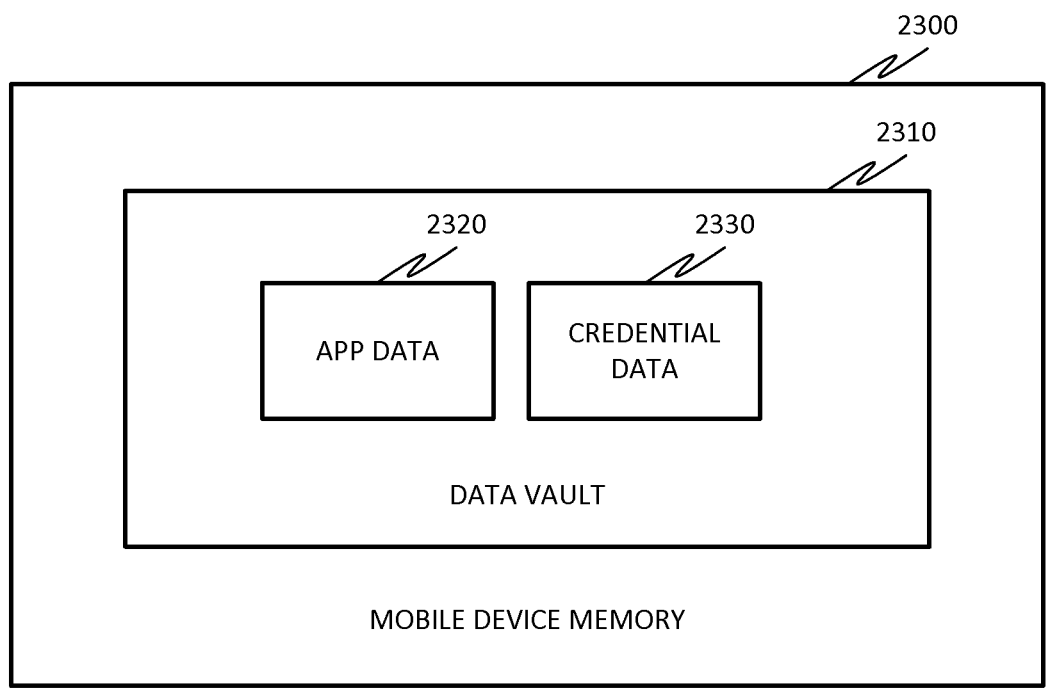
FIG. 23 is a block diagram illustrating a data vault stored in memory of a mobile device, in accordance with an example embodiment.

As described herein, in some example embodiments, a data vault is created after a successful registration. Device users may disable the data vault passcode and may specify a passcode, or may use a default passcode. FIG. 23 is a block diagram illustrating system, in accordance with an example embodiment. A data vault 2310 may be stored in memory 2300 of a mobile device.

The data vault 2310 securely stores various data or information, such as application data 2320 and credential data 2330, using the passcodes described herein to prevent unauthorized access to the data 2320 or 2330 contained with the data vault 2310. The data vault 2310 may be specific to a single mobile application, both data 2320 for the mobile application as well as user credential data 2330 that enables a user to access services provided by the mobile application (e.g., services or data provided by a server in communication with the mobile application). Therefore, in some example embodiments, the data vault 2310 provides a secure location within a mobile device in which to store mobile application data and corresponding credential information that is used to access the mobile application, among other things.

Figure 24:
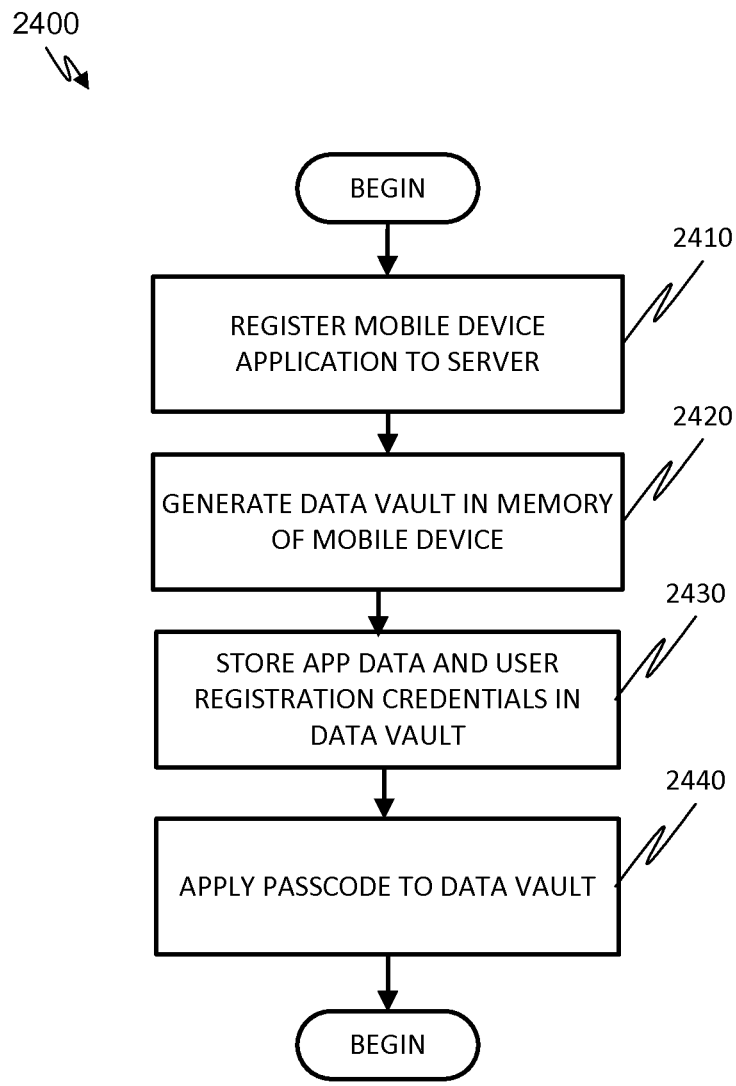
FIG. 24 is a flow diagram illustrating a method, in accordance with an example embodiment, of storing data in a data vault.

FIG. 24 is a flow diagram illustrating a method 2400 of storing data in a data vault, in some example embodiments. The method 2400 may be performed by the logon manager 220 or 300 and, accordingly, is described herein merely by way of reference thereto. It will be appreciated that the method 2400 may be performed on any suitable hardware.

In operation 2410, the logon manager 220 registers a mobile device application to a server. In operation 2420, the logon manager 220 generates a data vault in memory of a mobile device. In operation 2430, the logon manager 220 stores application data and user registration credentials in the data vault. In operation 2440, the logon manager 220 applies a passcode to the data vault.

For example, during a successful registration of a mobile application to a platform (such as via one of the scenarios described herein) the logon manager 220 accesses authorization credentials for a user of a mobile application supported by a mobile device, the authorization credentials used to register the user with a service provided via the mobile application, and stores the mobile application and the authorization credentials in a password-protected location (e.g., the data vault) supported by the mobile device. The logon manager 220 may assign a passcode to the mobile application having a syntax that follows password policy rules applied to the mobile application, among other things.

In some example embodiments, if the data vault is locked with a custom passcode, the logon UI is presented with an Unlock screen. Users may unlock the data vault with the passcode they have set. If the user provides a wrong passcode multiple times, the data vault deletes itself. The user may determine the maximum number of tries by a data vault property, which may be set in the password policy. Additionally, the user may set the data vault timeout in the password policy. For example, the MAFLogonManagerNG 330 downloads the timeout value from the Mobile Platform server during registration.

When device users forget their passcodes, they may tap a Forgot passcode button on the Unlock screen, which erases all client-side data. If there is an Mobile Platform server in the landscape, tapping the Forgot passcode button deletes both the client- and server-side registrations. This occurs when the device is connected to a network where the Mobile Platform server is reachable. Otherwise, an administrator may manually remove the server-side registration.

The logon manager 220 may handle Timeouts in a variety of ways, including:

An automatic data vault timeout—the Mobile Platform data vault has a built-in timeout that is handled by the data vault itself. This is managed by the Mobile Platform server password policy (see the "PasswordPolicyLockTimeout"

key) and set when the data vault is created. The timeout property determines the length of time a successfully unlocked data vault remains open. When the timeout value elapses, the vault is locked and the device user has to reenter the vault passcode to resume using the application.

A background stay timeout—because of the way iOS systems work, and to keep the dependency between the components manageable, MAFLogonManagerNG 330 and MAFLogonUING implement a mechanism that tracks the amount of time the application spends in the background. The data vault can lock itself only when the application is in the foreground. That is, a passcode should expire only while the device user is actually using the application. Different events, such as an incoming phone call, may move the application to the background. To support the locking of data vault in such cases, MAFLogonManagerNG 330 may subscribe to the iOS applicationWillResignBeingActive UIApplication Notification to save a timestamp. When the application again becomes active, the MAFLogonUING is notified that a Resume event has occurred. The MAFLogonUING then checks whether the time elapsed since the timestamp is greater than the timeout value and if it is, calls the MAFLogonManagerNG 330 to close the data vault. A user may change the lock timeout for the application in the Apple Settings, among other things.

In some example embodiments, the logon manager 220 provides client side credentials and a connection settings sharing mechanism for the MAF Logon based iOS applications. In order to use the features of Client Hub, a Client Hub iOS application should be installed on a device, and a Client Hub may be initialized with an SSO password. Once the Client Hub iOS application is installed and initialized, MAF Logon supports credential and connection sharing across applications.

In some example embodiments, in order to prepare an application to register it for Client Hub, a signing certificate that was used to sign the application to the Client Hub application should be present. This is needed because the applications use shared Keychain. The Keychain may only be shared between applications that are signed by the same certificate. Also, an entitlements file in the xcode project should be present.

These actions facilitate the sharing of a common Keychain across the two applications. In order to register an application to Client HUB, another descriptor file should be present.

Once these configuration files are provided in the project and both the project and mobile platform Client Hub are deployed on the device (both signed with the same key), the testing of mobile platform Client Hub based credentials and connection sharing may begin.

The MAF Logon can first check to see if the application has the mobile platform Client Hub installed on the device. If it finds the application it can check if it is properly initialized or not (e.g., whether the SSO Password was specified by the user or not). Once the MAF Logon sees that it is initialized, it can display the mobile platform Client Hub Logon UI screen and can ask the user to input the mobile platform Client Hub password. The user can choose to tap "Skip". This means that the user does not want to couple this particular application with the mobile platform Client Hub application. Once the user taps "Skip" the next time he starts the application it cannot present the SSO Passcode UI.

If the user fills in an SSO passcode and taps "Next" bar button item, then MAF Logon can check if it can open the mobile platform Client Hub with the provided password; if it can, it can store the password in its own Secure Store for later use. Once the MAF Logon can open the mobile platform Client Hub it can ask credentials and connection data from the mobile platform Client Hub libraries. If the mobile platform Server does not provide particular connectivity information for this application, the Client Hub libraries can ask the application for default values. These are read up from the clienthub.plist file. If there are no shared credentials, the MAF Logon can present the Logon UI with two fields to provide backend username and backend password. Once the registration succeeds with these new credentials and the connection data provided either by the mobile platform Server or the default clienthub.plist, the MAF Logon stores the credentials into mobile platform Client Hub.

Once an application that was registered with Client Hub is re-launched, the MAF Logon can check certain things. First of all it can check if the Client Hub is still present on the device. If not, then it can de-couple from the Client Hub application. This means that this application cannot check again for Client Hub. Neither can it share credentials or connection information with any future application installation through a new Client Hub install. To achieve this, the application would need to be deleted from the device and then re-installed again.

If the Client Hub application is still available, then MAF Logon checks if the SSO Passcode is still valid. If the SSO Passcode is not valid, then the MAF Logon UI can be presented to get the new SSP Passcode from the end-user. Once the Client Hub has successfully opened, MAF Logon can fetch the credentials stored in the Client Hub. The MAF Logon then compares the backend user and backend password with the variant stored in the Secure Store of the application to see if they are still identical. If the Client Hub application does not contain any credentials or the credentials stored in the Secure Store of the application are newer, then MAF Logon can write the credentials into Client Hub application. If the credentials stored in the Secure Store of the application are older than the Client Hub version, then it can write the newer credentials into the Secure Store of the application. After this the usual application process is launched.

From time-to-time the backend password may be updated. When this happens, the MAF Logon can present the Backend Password screen to get the new password. Once the new password is verified, the MAF Logon can share the new password with other applications through the Client Hub. In order to do so it first can check if the Client Hub application is still present on the device. If the Client Hub application is still available, then the MAF Logon checks if the SSO Passcode is still valid. If the SSO Passcode is not valid, then the MAF Logon UI can be presented to get the new SSP Passcode from the end-user. Once the Client Hub has successfully opened, MAF Logon can fetch the credentials stored in the Client Hub. It then compares the backend user and backend password with the variant stored in the Secure Store of the application to see if they are still identical. If the Client Hub application does not contain any credentials or the credentials stored in the Secure Store of the application are newer, then MAF Logon can write the credentials into Client Hub application. If the credentials stored in the Secure Store of the application are older than the Client Hub version, then MAF Logon can write the newer credentials into the Secure Store of the application. After this the usual application process is launched.

In some example embodiments, the MAF 1.2 is optimized for a particular mobile platform. While working with the latest communication protocols and features of the mobile platform, it provides backward compatibility for earlier mobile platform servers. In the past, a mobile platform might have provided its own proprietary protocol called iMO. This protocol is still supported by MAF Logon. In order to use this protocol the iMO libraries may be added to the project: libMo.a, libSupProxyClient.a, and libsupClientUtil.a.

Once these libraries are provided to the project, MAF Logon can use them and offer iMO protocol. If these libraries are not present on the project, the MAF Logon can offer the new HTTP REST protocol. Even though iMO libraries are provided in the project, there might be some cases when HTTP REST protocol can be used instead. If the mobile platform supports both iMO and HTTP REST protocols on the same communication port, the MAF Logon may prefer HTTP REST protocol. iMO may be used in cases where the mobile platform server does not support HTTP REST protocol.

Figure 25:
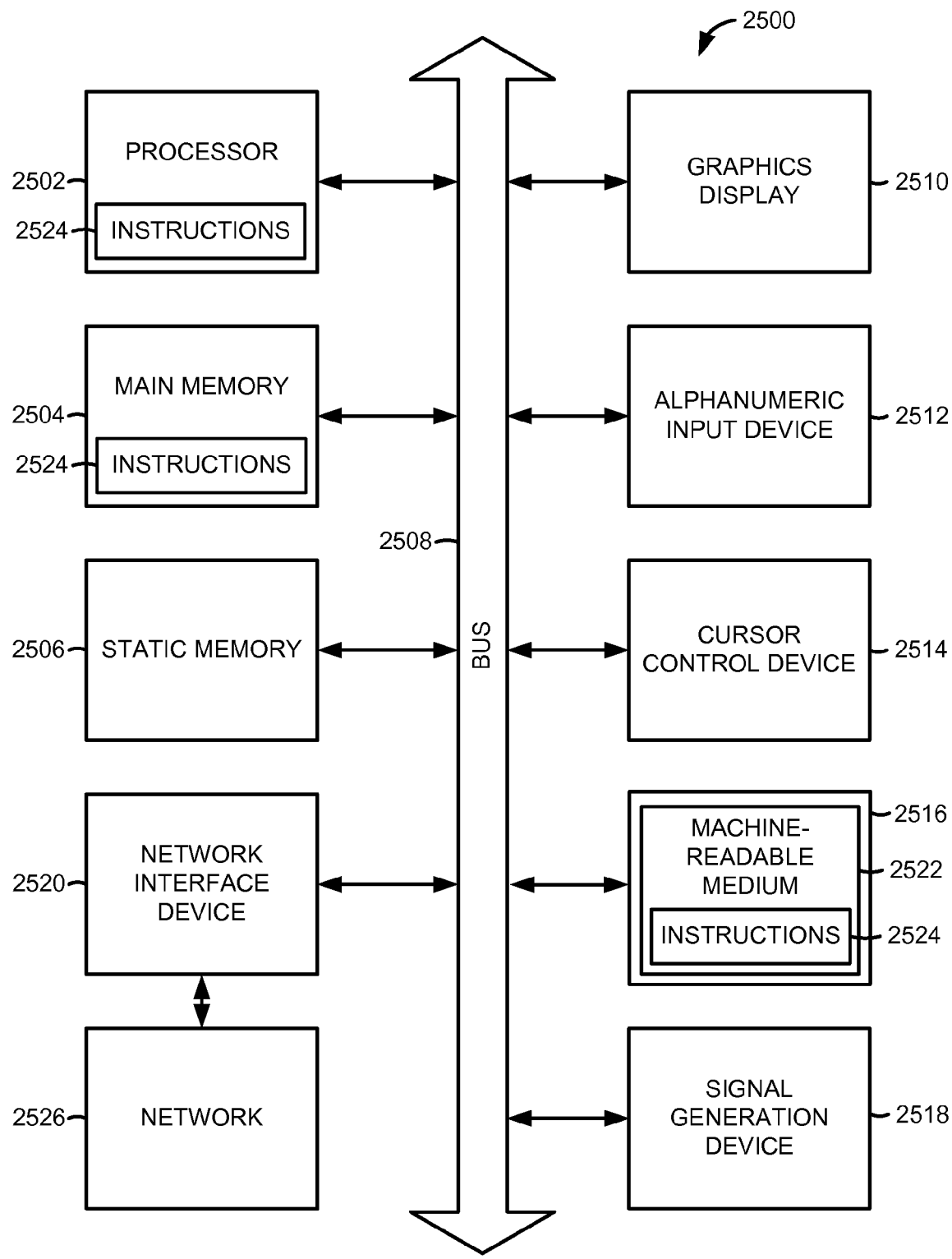
FIG. 25 is a block diagram illustrating components of a machine, according to some example embodiments, able to read instructions from a machine-readable medium and perform any one or more of the methodologies discussed herein.

FIG. 25 is a block diagram illustrating components of a machine 2500, according to some example embodiments, able to read instructions from a machine-readable medium (e.g., a machine-readable storage medium) and perform any one or more of the methodologies discussed herein, in whole or in part. Specifically, FIG. 25 shows a diagrammatic representation of the machine 2500 in the example form of a computer system and within which instructions 2524 (e.g., software, a program, an application, an applet, an app, or other executable code) for causing the machine 2500 to perform any one or more of the methodologies discussed herein may be executed. In alternative embodiments, the machine 2500 operates as a stand-alone device or may be connected (e.g., networked) to other machines. In a networked deployment, the machine 2500 may operate in the capacity of a server machine or a client machine in a server-client network environment, or as a peer machine in a peer-to-peer (or distributed) network environment. The machine 2500 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 2524, sequentially or otherwise, that specify actions to be taken by machine 2500. Further, while only a single machine 2500 is illustrated, the term "machine" shall also be taken to include a collection of machines that individually or jointly execute the instructions 2524 to perform any one or more of the methodologies discussed herein.

The machine 2500 includes a processor 2502 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 2504, and a static memory 2506, which are configured to communicate with each other via a bus 2508. The machine 2500 may further include a graphics display 2510 (e.g., a plasma display panel (PDP), a light emitting diode (LED) display, a liquid crystal display (LCD), a projector, or a cathode ray tube (CRT)). The machine 2500 may also include an alphanumeric input device 2512 (e.g., a keyboard), a cursor control device 2514 (e.g., a mouse, a touchpad, a trackball, a joystick, a motion sensor, or other pointing instrument), a storage unit 2516, a signal generation device 2518 (e.g., a speaker), and a network interface device 2520.

The storage unit 2516 includes a machine-readable medium 2522 on which is stored the instructions 2524 embodying any one or more of the methodologies or functions described herein. The instructions 2524 may also reside, completely or at least partially, within the main memory 2504, within the processor 2502 (e.g., within the processor's cache memory), or both, during execution thereof by the machine 2500. Accordingly, the main memory 2504 and the processor 2502 may be considered as machine-readable media. The instructions 2524 may be transmitted or received over a network 2526 via the network interface device 2520.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 2522 or computer-readable medium is shown in an example embodiment to be a single medium, the term "machine-readable medium" or "computer-readable medium" should be taken to include a single medium or multiple media (e.g., a centralized or distributed database, or associated caches and servers) able to store instructions 2524. The term "machine-readable medium" or "computer-readable medium" shall also be taken to include any medium, or combination of multiple media, that is capable of storing instructions (e.g., instructions 2524) for execution by a machine or computer (e.g., machine 2500), such that the instructions, when executed by one or more processors of the machine or computer (e.g., processor 2502), cause the machine or computer to perform any one or more of the methodologies described herein. Accordingly, a "machine-readable medium" refers to a single storage apparatus or device, as well as "cloud-based" storage systems or storage networks that include multiple storage apparatuses or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some example embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

We claim:

1. A method performed by a mobile device application, comprising:
    sending a test request from the mobile device application operating on a mobile device to a server configured to provide data to the mobile device application, the sending including sending a request that includes information in a property list provided by a user associated with the mobile device application;
    receiving, at the mobile device application, a response to the test request from the server;
    analyzing, at the mobile device application, the response to the test request to identify a pattern in the response indicative of a communication sent via a particular communication path, the pattern indicating that the test request passed through a first node between the mobile device and the server;

identifying, at the mobile device application, an available communication path between the mobile device application and the server corresponding to the pattern;

generating the identified communication path by creating a first communications path between the mobile device and the server, the first communications path including the first node; and registering the mobile device application with the server via the first communication path.

2. The method of claim 1, wherein registering the mobile device application with the server via the first communication path includes:

registering the mobile device application using authorization credentials provided by a user, the authorization credentials used to register the user with a service provided by the server via the mobile device application;

accessing the authorization credentials for the user of the mobile device application; and storing the mobile device application and the authorization credentials in a password-protected location of a mobile device that provides the mobile device application.

3. The method of claim 2, wherein storing the mobile device application and the authorization credentials in a password-protected location supported by the mobile device includes assigning a passcode to the mobile device application having a syntax that follows password policy rules applied to the mobile device application.

4. The method of claim 2, wherein the password-protected location only contains contents of the mobile device application and the authorization credentials.

5. The method of claim 2, wherein the authorization credentials include a username and password provided by the user that are used by the mobile device application to register the user with the service provided by the server via the mobile application.

6. The method of claim 1, wherein the pattern includes header information, code, or cookie information within the response to the test request that is indicative of a gateway communication path.

7. The method of claim 1, wherein the pattern includes header information, code, or cookie information within the response to the test request that is indicative of a mobile platform communication path.

8. The method of claim 1, wherein the pattern includes header information, code, or cookie information within the response to the test request that is indicative of a gateway communication path and an Internet Information Services (IIS) server type.

9. The method of claim 1, wherein the pattern includes header information, code, or cookie information within the response to the test request that is indicative of a gateway communication path and an Apache server type.

10. A logon manager operating on a mobile device and comprising:

a test request module executable by a processor and configured to send a test request to a server configured to provide data to a mobile device application the sending including sending a request that includes information in a property list provided by a user associated with the mobile device application;

a server response module configured to receive a response to the test request from the server;

a path identification module configured to analyze the response to the test request to identify a pattern in the response indicative of a communication sent via a particular communication path, the pattern indicating that the test request passed through a first node between the mobile device and the server, and identify an available communication path between the mobile device application and the server corresponding to the pattern; and a registration module configured to generate the identified communication path by creating a first communications path between the mobile device and the server, the first communications path including the first node and to register the mobile device application with the server via the first communication path.

11. The logon manager of claim 10, wherein the logon manager is located within a deployable unit containing custom code and a mobile application framework.

12. The logon manager of claim 10, wherein the registration module is further configured to:

register the mobile device application using authorization credentials provided by a user, the authorization credentials used to register the user with a service provided by the server via the mobile device application;

access the authorization credentials for the user of the mobile device application; and store the mobile device application and the authorization credentials in a password-protected location of a mobile device that provides the mobile device application.

13. The logon manager of claim 12, wherein storing the mobile device application and the authorization credentials in a password-protected location supported by the mobile device includes assigning a passcode to the mobile device application having a syntax that follows password policy rules applied to the mobile device application.

14. The logon manager of claim 12, wherein the password-protected location only contains contents of the mobile device application and the authorization credentials.

15. A non-transitory machine-readable storage medium comprising instructions, which when implemented by one or more machines, cause the one or more machines to perform operations comprising:

sending a test request from the mobile device application operating on a mobile device to a server configured to provide data to the mobile device application the sending including sending a request that includes information in a property list provided by a user associated with the mobile device application;

receiving, at the mobile device application, a response to the test request from the server;

analyzing, at the mobile device application, the response to the test request to identify a pattern in the response indicative of a communication sent via a particular communication path, the pattern indicating that the test request passed through a first node between the mobile device and the server;

identifying, at the mobile device application, an available communication path between the mobile device application and the server corresponding to the pattern;

generating the identified communication path by creating a first communications path between the mobile device and the server, the first communications path including the first node; and registering the mobile device application with the server via the first communication path.

16. The non-transitory machine-readable storage medium of claim 15, wherein registering the mobile device application with the server via the first communication path includes:

registering the mobile device application using authorization credentials provided by a user, the authorization credentials used to register the user with a service provided by the server via the mobile device application;

accessing the authorization credentials for the user of the mobile device application; and storing the mobile device application and the authorization credentials in a password-protected location of a mobile device that provides the mobile device application.

17. The non-transitory machine-readable storage medium of claim 16, wherein storing the mobile device application and the authorization credentials in a password-protected location supported by the mobile device includes assigning a passcode to the mobile device application having a syntax that follows password policy rules applied to the mobile device application.

18. The non-transitory machine-readable storage medium of claim 17, wherein the password-protected location only contains contents of the mobile device application and the authorization credentials.

19. The non-transitory machine-readable storage medium of claim 16, wherein the authorization credentials include a username and password provided by the user that are used by the mobile device application to register the user with the service provided by the server via the mobile device application.

\* \* \* \* \*